US012508179B2

(12) United States Patent
Garven, Jr.

(10) Patent No.: US 12,508,179 B2
(45) Date of Patent: Dec. 30, 2025

(54) WHEELCHAIR

(71) Applicant: PERMOBIL, INC., Lebanon, TN (US)

(72) Inventor: Douglas Michael Garven, Jr., Lebanon, TN (US)

(73) Assignee: PERMOBIL, INC., Lebanon, TN (US)

( * ) Notice: Subject to any disclaimer, the term of this patent is extended or adjusted under 35 U.S.C. 154(b) by 885 days.

(21) Appl. No.: 17/585,152

(22) Filed: Jan. 26, 2022

(65) Prior Publication Data

US 2023/0233387 A1 Jul. 27, 2023

(51) Int. Cl.
*A61G 5/10* (2006.01)

(52) U.S. Cl.
CPC .................................... *A61G 5/10* (2013.01)

(58) Field of Classification Search
CPC ........ A61G 5/00; A61G 5/1054; A61G 5/125; A61G 5/127; A61G 5/128; A61G 5/10; A61G 5/02; Y10S 297/04; A61H 2201/0149; B60B 33/04
USPC ................... 403/231; 280/250.1; 297/DIG. 4
See application file for complete search history.

(56) References Cited

U.S. PATENT DOCUMENTS

| | | | | |
|---|---|---|---|---|
| 2,520,309 | A | 8/1950 | Everest et al. | |
| 4,852,899 | A | 8/1989 | Kueschall | |
| 4,887,826 | A | 12/1989 | Kantner | |
| 5,131,672 | A | 7/1992 | Robertson et al. | |
| 5,152,543 | A | 10/1992 | Sims et al. | |
| 5,233,743 | A | 8/1993 | Robertson et al. | |
| 5,267,745 | A * | 12/1993 | Robertson | A61G 5/128 29/469 |
| 5,294,142 | A | 3/1994 | Weege | |
| 5,320,373 | A | 6/1994 | Robertson et al. | |
| 5,333,894 | A | 8/1994 | Mayes | |
| 5,361,494 | A * | 11/1994 | Robertson | A61G 5/1091 29/897 |
| 5,382,036 | A | 1/1995 | Counts et al. | |
| 5,590,893 | A | 1/1997 | Robinson et al. | |
| 5,662,345 | A | 9/1997 | Kiewit | |
| 5,851,018 | A | 12/1998 | Curran et al. | |
| 6,168,177 | B1 | 1/2001 | Schillo et al. | |
| 6,168,178 | B1 | 1/2001 | Garven, Jr. et al. | |
| 6,182,992 | B1 | 2/2001 | Garven, Jr. | |

(Continued)

FOREIGN PATENT DOCUMENTS

| | | |
|---|---|---|
| CN | 206621484 U | 11/2017 |
| CN | 106313583 B | 7/2018 |

(Continued)

OTHER PUBLICATIONS

International Preliminary Report on Patentability for Application No. PCT/US2022/053661 dated Apr. 9, 2024 (22 pages).

(Continued)

*Primary Examiner* — Alentin Neacsu
*Assistant Examiner* — Nabin Kumar Sharma
(74) *Attorney, Agent, or Firm* — Michael Best & Friedrich LLP

(57) ABSTRACT

A frame assembly for a wheelchair includes a first side member, and a first leg support member coupled to the first side member. The first leg support member includes a first curved portion and a second curved portion, the first curved portion oriented to curve in a first direction, the second curved portion oriented to curve in a second direction, and the first and second directions being different.

21 Claims, 19 Drawing Sheets

(56) References Cited

U.S. PATENT DOCUMENTS 6,247,717 B1 6/2001 Lovins et al.
6,264,218 B1 7/2001 Slagerman
6,264,225 B1 7/2001 Kunishige et al.
6,273,445 B1 8/2001 Garven, Jr.
6,311,999 B1 * 11/2001 Kueschall ............ A61G 5/1091 280/250.1
6,312,002 B1 * 11/2001 Slagerman ........... A61G 5/1018 280/250.1
6,318,751 B1 11/2001 Slagerman
6,394,476 B1 5/2002 Molnar
6,464,243 B2 10/2002 Roche
6,974,194 B2 12/2005 Schreiber et al.
7,021,640 B2 4/2006 Knopf et al.
7,249,773 B2 7/2007 Schreiber et al.
7,520,518 B2 * 4/2009 Peterson ............. B60B 33/0007 403/231
8,002,300 B2 8/2011 Ludovici et al.
8,042,824 B2 10/2011 Borisoff
8,256,785 B2 9/2012 Knopf
8,328,215 B2 12/2012 Knopf
8,490,994 B2 7/2013 Knopf
8,628,108 B2 1/2014 Gingras et al.
9,050,224 B2 6/2015 Slorance
9,119,756 B2 9/2015 MacPherson
9,308,142 B2 4/2016 Harding
9,358,164 B2 6/2016 Brenner et al.
9,801,766 B1 10/2017 Slagerman et al.
9,844,479 B2 12/2017 Gingras et al.
2003/0034635 A1 2/2003 Ludovici
2004/0173991 A1 9/2004 Watterton et al.
2006/0055143 A1 3/2006 Schreiber et al.
2010/0007114 A1 1/2010 Papi et al.
2010/0090437 A1 * 4/2010 Knopf ..................... A61G 5/128 280/250.1
2017/0333268 A1 11/2017 Gingras et al.

FOREIGN PATENT DOCUMENTS

EP 2213268 B1 1/2013
FR 2913656 A3 9/2008
FR 2960420 A1 12/2011
GB 2280405 B 9/1996
WO WO-9411236 A1 * 5/1994 ............... A61G 5/00
WO 9847342 A2 10/1998
WO 2013114133 A1 8/2013
WO 2017147704 A1 9/2017
WO 2017147705 A1 9/2017

OTHER PUBLICATIONS

International Search Report and Written Opinion for Application No. PCT/US2022/053661 dated May 4, 2023 (13 pages).
Apex, “Ultralight Ridgid Wheelchair,” 70380-b.3 Apex User Manual, 2018 (32 pages).
CareCure Community, “Another Custom Carbon Fiber Wheelchair,” <http://sci.rutgers.edu/forum/showthread.php?258143-Another-custom-carbon-fiber-wheelchair> web page publicly available at least as early as Aug. 9, 2018.
Krypton F, “Folding Wheelchair,” <https://www.sunrisemedical.com/au/wheelchairs/quickie/lightweight-wheelchairs/ krypton-carbon-fibre-folding-wheelchair> web page publicly available at least as early as Aug. 9, 2018.
Motion Composites, “Apex Carbon,” Brochure, 2017 (6 pages).
Progeo, “Carbomax,” User’s Manual, Rev. 1, Aug. 5, 2017 (28 pages).
Quickie, “Quickie Q7,” Parts Manual, Jul. 2018 (205 pages).

* cited by examiner

WHEELCHAIR

FIELD

The present disclosure relates to a wheelchair. More specifically, the present disclosure relates to an improved frame assembly for a wheelchair that can be customized in response to needs of a user.

BACKGROUND

Manual wheelchairs are generally known in the art. A manual wheelchair generally includes two pairs of wheels, one pair of large diameter wheels and one pair of caster wheels. Manual wheelchairs may have a varied footprint size depending on the specific intended use of the wheelchair. However, even for wheelchairs with a comparatively smaller footprint, there can still be issues with maneuvering in narrow or tight spaces. Further manual wheelchairs are not always customizable for a user. Accordingly, what is needed is an improved wheelchair design that can improve maneuverability and closer position the wheelchair to an object, while maintaining wheelchair stability. In addition, what is needed is improved wheelchair customization options to better match the wheelchair to the user.

SUMMARY

In some examples of embodiments, a frame assembly for a wheelchair includes a first side member, and a first leg support member coupled to the first side member. The first leg support member includes a first curved portion and a second curved portion, the first curved portion oriented to curve in a first direction, the second curved portion oriented to curve in a second direction, and the first and second directions being different.

In other examples of embodiments, a frame assembly for a wheelchair includes a frame assembly for a wheelchair that includes a first side member, a second side member spaced from the first side member, a first leg support member defining a first end opposite a second end, the first end coupled to the first side member, a second leg support member defining a first end opposite a second end, the first end coupled to the second side member, and a foot support coupled to the second ends of the first and second leg support members. The first leg support member and the second leg support member each define a first curved portion and a second curved portion located between the first and second ends, the first curved portion oriented to curve in a direction different than the first curved portion.

Other aspects of the disclosure will become apparent by consideration of the detailed description and accompanying drawings.

Before embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

DETAILED DESCRIPTION

The figures illustrate one or more examples of embodiments of a wheelchair 100, 100*a*. The wheelchair 100, 100*a* generally includes a customizable frame assembly 200, 200*a*. The customizable frame assembly 200, 200*a* can be used alone, or in combination with an adjustable axle assembly 300, 300*a*. It should be appreciated that in some embodiments, one or more components of the wheelchair 100, 100*a*, including but not limited to the frame assembly 200, 200*a* and axle assembly 300, 300*a* can be formed of carbon fiber. In other embodiments, one or more components of the wheelchair 100, 100*a*, including but not limited to the frame assembly 200, 200*a*, can be formed of a metal (or metal alloy), such as aluminum, titanium, steel, etc. In other examples of embodiments, the wheelchair 100, 100*a* can be formed of any suitable or desired material or combination of materials. In addition, the wheelchair 100, 100*a* is illustrated as a manual wheelchair.

Figure 1:
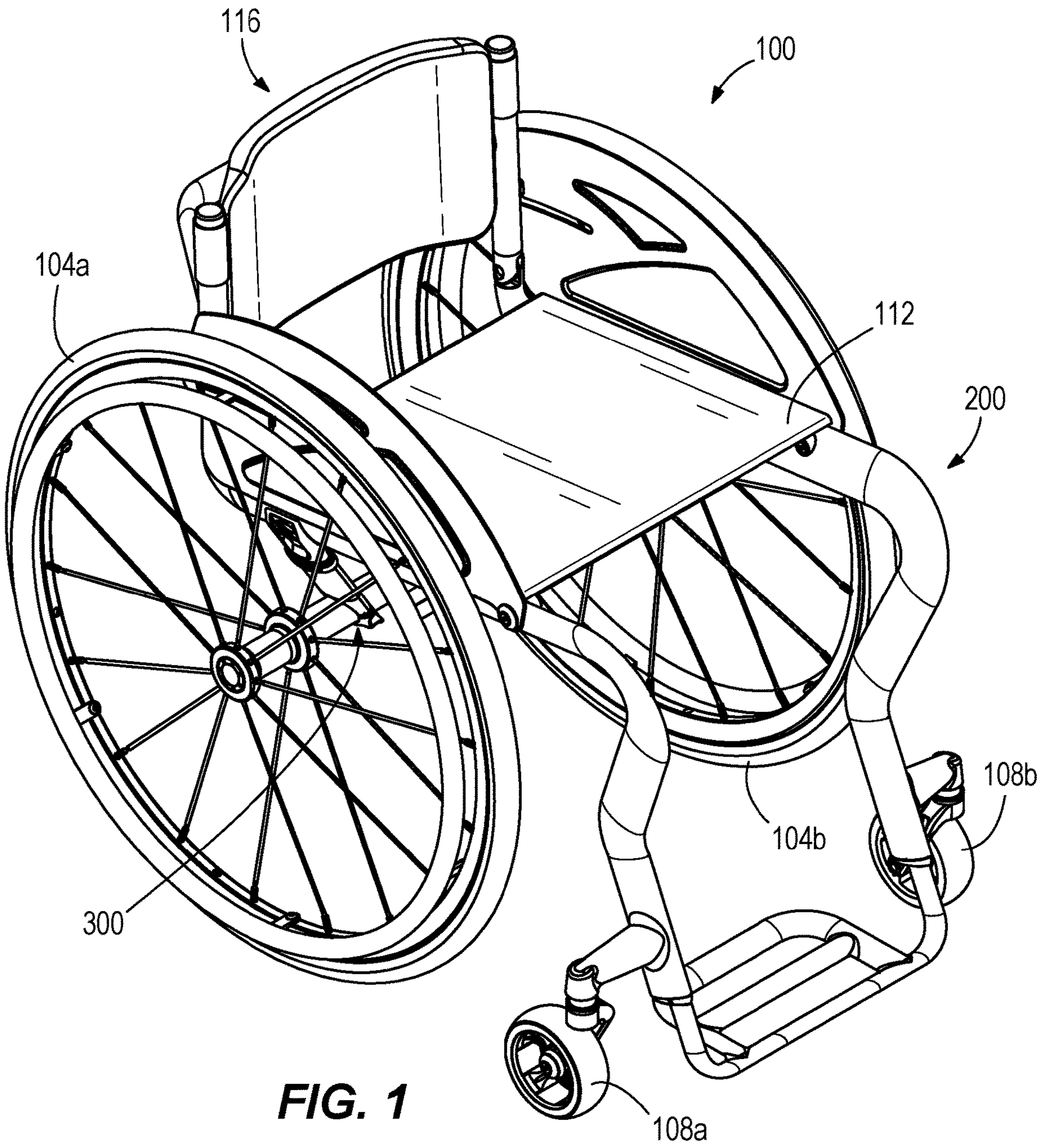
FIG. 1 is a perspective view of a wheelchair incorporating an example of an embodiment of a frame assembly.

With reference now to FIG. 1, an embodiment of a wheelchair 100 is illustrated. The wheelchair 100 includes a pair of rear wheels 104*a*, 104*b* (also referred to as drive wheels or first wheels 104*a*, 104*b*), a pair of caster wheels 108*a*, 108*b* (also referred to as casters or second wheels

108a, 108b), a seat support 112 (also referred to as a seat pan 112), a back support assembly 116, a frame assembly 200, and an axle assembly 300. Each of the drive wheels 104a, b are coupled to the axle assembly 300. The axle assembly 300 is coupled to the frame assembly 200. The caster wheels 108a, b are also coupled to the frame assembly 200. The seat support 112 and back support assembly 116 are respectively coupled (or fastened) to the frame assembly 200.

In the illustrated embodiment, the seat support 112 is removably fastened to a portion of the frame assembly 200. For example, the seat support 112 can be bolted, coupled, or otherwise engaged with the frame assembly 200. The seat support 112 can include a seat cushion fastening assembly (not shown) configured to couple a seat cushion (not shown) to the seat support 112. The seat cushion fastening assembly can be any fastener suitable for coupling a seat cushion to the seat support 112 (e.g., a hook and loop fastener, a snap, a button, etc.). In the illustrated embodiment, the seat support 112 is formed of carbon fiber. In other examples of embodiments, the seat support 112 can be formed of any suitable material for a wheelchair 100 (e.g., titanium, aluminum, or other metal or metal alloy, textile, fabric, upholstery, cloth, etc.). In other examples of embodiments, the wheelchair 100 does not include the seat support 112. In these embodiments, an upholstered seat (not shown) can be selectively fastened to the frame assembly 200.

The back support assembly 116 is also removably fastened to a portion of the frame assembly 200. More specifically, the back support assembly 116 is configured to removably fasten to a backrest assembly 214 (shown in FIG. 2). The back support assembly 116 can be configured to selectively fasten to canes 212, 212a (shown in FIG. 2) of the backrest assembly 214. The back support assembly 116 can be any suitable back support for a wheelchair 100. For example, the back support assembly 116 can be formed of an upholstery, textile, or other suitable fabric.

Figure 2:
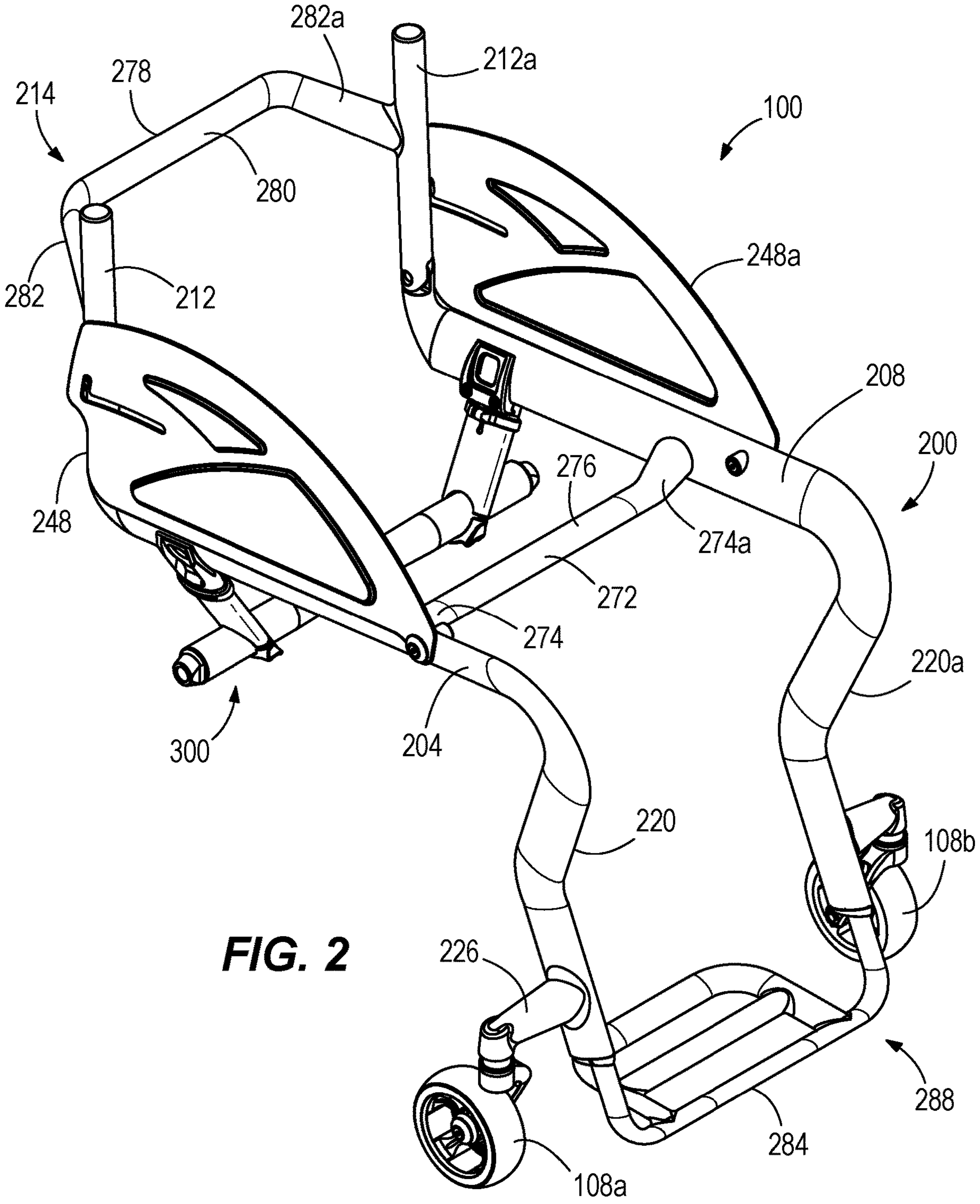
FIG. 2 is a perspective view of the frame assembly of the wheelchair of FIG. 1 with the rear wheels, seat support, and back support removed.

With reference now to FIGS. 2-7, the wheelchair 100 is shown with the rear wheels 104, the seat support 112, and the back support 116 removed to further illustrate the frame assembly 200 and the axle assembly 300. With reference to FIG. 2, the frame assembly 200 includes a first side frame 204 and a second side frame 208. The second side frame 208 is substantially a mirror image of the first side frame 204. As such, the second side frame 208 includes the same components as the first side frame 204. The components of the second side frame 208 are described and illustrated with the same identification numbers used in association with the first side frame 204, but with an "a."

Figure 3:
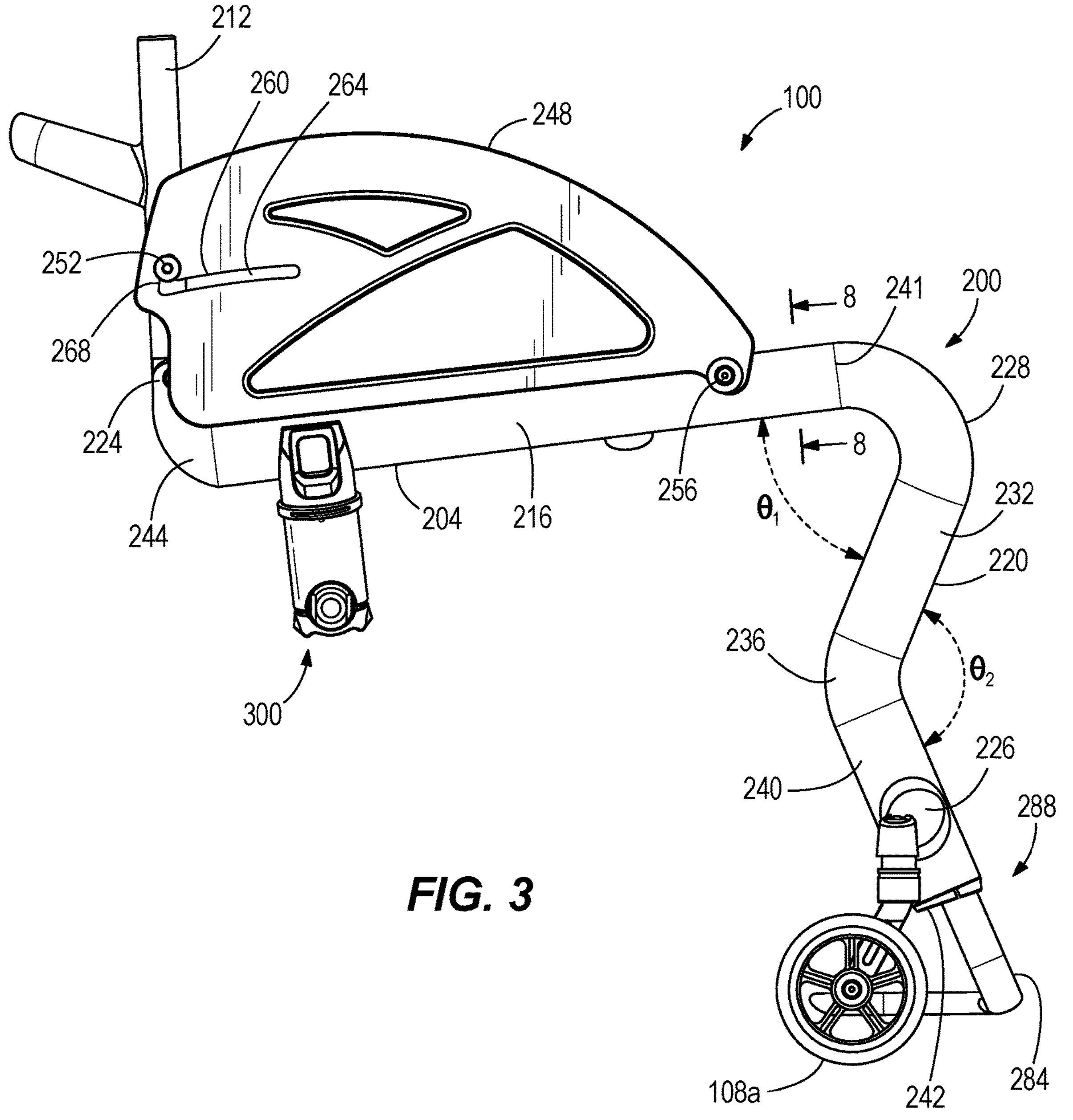
FIG. 3 is a first side view of the frame assembly of FIG. 2.

With specific reference to FIG. 3, the first side frame 204 includes a first cane 212, a first side member 216, and a first leg support member 220. The first cane 212 is fastened to the first side member 216 by a first hinge 224. The first hinge 224 facilitates a hinged connection between the first cane 212 and the first side member 216. In the illustrated embodiment, the first hinge 224 pivots relative to a hinge axis AH (shown in FIG. 6). The hinge axis Au is arranged perpendicular to the first side member 216, and the first cane 212. This allows the first cane 212 to pivot relative to the first side member 216, and more specifically towards or away from the first side member 216. In other embodiments, the first hinge 224 can be oriented such that the hinge axis Au can be oriented parallel to the first side member 216, or the hinge axis Au can be oblique to the first side member 216. In yet other embodiments, the first hinge 224 can be optional, such that the first cane 212 can be fastened to the first side member 216 (i.e., without a hinge 224).

With continued reference to FIG. 3, the first leg support member 220 is fastened to the first side member 216. The first caster wheel 108a is coupled to the first leg support member 220. More specifically, the first caster wheel 108a is rotatably coupled to a first mounting arm 226 (also referred to as a first caster mounting arm 226). The first mounting arm 226 is fastened to the first leg support member 220 The first mounting arm 226 extends outward and rearward from the first leg support member 220. Stated another way, the first mounting arm 226 extends away (or is horizontally offset) from the first leg support member 220 and is swept towards the first cane 212 (or towards a back of the wheelchair 100).

The first leg support member 220 is coupled to the first side member 216. In addition, the first leg support member 220 extends away from the first side member 216 and defines a plurality of curves. More specifically, the first leg support member 220 includes a first curved portion 228, a first elongated portion 232, a second curved portion 236, and a second elongated portion 240. The first curved portion 228 is coupled (or formed) at one end (or a first end) to the first side member 216, and at the other end (or a second end) to the first elongated portion 232. The second curved portion 236 is coupled (or formed) at one end (or a first end) to the first elongated portion 232, and at the other end (or a second end) to the second elongated portion 240. Accordingly, the first elongated portion 232 extends between (or is positioned between) the first and second curved portions 228, 236. The first curved portion 228, the first elongated portion 232, the second curved portion 236, and the second elongated portion 240 are consecutively connected (or consecutively formed) to define the leg support member 220. It should also be appreciated that the first side member 216 can be consecutively connected (or consecutively formed) with the first leg support member 220.

The first curved portion 228 has an arcuate portion that is oriented to curve in a first direction, and further defines a first angle $\theta_1$. The first angle $\theta_1$ extends between the first side member 216 and the first elongated portion 232. The first angle $\theta_1$ is positioned at the shortest distance between the first side member 216 and the first elongated portion 232. The first angle $\theta_1$ is an angle of less than ninety degrees. More specifically, the first angle $\theta_1$ is an angle in a range of approximately 45 degrees and approximately 70 degrees, and more specifically in a range of approximately 50 degrees and approximately 65 degrees, and more specifically in a range of approximately 55 degrees and approximately 61 degrees. Stated another way, the first angle $\theta_1$ is an acute angle. The first angle $\theta_1$ is positioned on a first side of the first leg support member 220. The first side of the first leg support member 220 faces a back side (or a back end) of the wheelchair 100.

The second curved portion 236 includes an arcuate portion that is oriented to curve in a second direction, and further defines a second angle $\theta_2$. The second angle $\theta_2$ extends between the first elongated portion 232 and the second elongated portion 240. The second angle $\theta_2$ is positioned at the shortest distance between the first elongated portion 232 and the second elongated portion 240. The second angle $\theta_2$ is an angle of more than ninety degrees. More specifically, the second angle $\theta_2$ is an angle in a range of approximately 115 degrees and approximately 155 degrees, and more specifically in a range of approximately 125 degrees and approximately 145 degrees, and more specifically is approximately 135 degrees. Stated another way, the second angle $\theta_2$ is an obtuse angle. The second angle $\theta_2$ is positioned on a second side of the first leg support member 220, opposite the first side. The second side of the first leg support member 220 faces a front side (or a front end) of the wheelchair 100. Stated another way, the first angle $\theta_1$ and the second angle $\theta_2$ are positioned on opposite sides of the first leg support member 220. Stated yet another way, the curve defined by the first angle $\theta_1$ and the curve defined by the second angle $\theta_2$ are oriented to curve in different directions, and more specifically in opposite directions. In the illustrated embodiment, the first angle $\theta_1$ faces towards the first cane 212, while the second angle $\theta_2$ faces away from the first cane 212. Stated another way, the first angle $\theta_1$ faces towards the first side member 216, while the second angle $\theta_2$ faces away from the first side member 216.

The first curved portion 228 and the second curved portion 236 cooperate to provide the first leg support member 220 with a serpentine geometry (also referred to as a double curve geometry or a S-shaped geometry). As shown in FIG. 3, the first leg support member 220 thus includes a plurality of curved portions 228, 236 positioned between a first end 241 and a second end 242 of the first leg support member 220. The first end 241 couples to the first side member 216, while the second end 242 is opposite the first end 241. The serpentine geometry (or double curve geometry) is positioned between the first and second ends 241, 242 of the first leg support member 220. Stated another way, the first leg support member 220 includes a plurality of angles, and more specifically a plurality of different angles when viewed from the side. The plurality of angles includes a backward sweep defined by the first curved portion 228 such that the first elongated portion 232 extends from the first curved portion 228 inward towards the back of the wheelchair 100. The plurality of angles also includes a forward sweep defined by the second curved portion 236 such that the second elongated portion 240 extends outward from the second curved portion 228 towards the front of the wheelchair 100. This geometry advantageously orients the first curved portion 228 (or a top of the first leg support member 220) in an offset vertical alignment with the caster wheel 108*a*. Stated another way, when viewed from the side shown in FIG. 3, the caster wheel 108*a* is in vertical alignment with the first curved portion 228. However, when viewed from a front view shown in FIG. 5, the caster wheel 108*a* is horizontally offset from the first curved portion 228 (and the second elongated portion 240) by the first mounting arm 226. As illustrated, the first mounting arm 226 is coupled to the second elongated portion 240 and carries the caster wheel 108*a*. The forward sweep defined by the second curved portion 236 and second elongated portion 240 allows for the first mounting arm 226 to extend outward and rearward relative to the second elongated portion 240 (see FIG. 7). When viewed from the side, as shown in FIG. 3, the first mounting arm 226 is positioned at an oblique angle to the second elongated portion 240. In the illustrated embodiment, this non-orthogonal angle formed between the first mounting arm 226 and the second elongated portion 240 allows for the caster wheel 108*a* to be positioned further rearward (or closer to the first cane 212 or closer to the first side member 216*a* or rearward swept) than a traditional wheelchair side frame with a vertically straight leg support member. The vertical alignment of the caster wheel 108*a* and the first curved portion 228, along with the serpentine geometry of the leg support member 220 and the rearward swept caster wheel 108*a* (by the mounting arm 226) advantageously provides improved maneuverability of the wheelchair 100. This allows a user to move the wheelchair 100 into tight spaces, as the geometry moves the leg support member 220 out of potential contact (or potential impact) of objects in the environment. In addition, the geometry allows a user to move the wheelchair closer to an object. This provides for easier and safer transfers into and out of the wheelchair 100 (e.g., transfer between the wheelchair 100 and another location, such as a toilet, car, bed, etc.). In other embodiments, the first curved portion 228 can be vertically aligned with the caster wheel 108*a* when viewed from the side view and the front view (i.e., there is no offset by the first mounting arm 226).

With continued reference to FIG. 3, the first side frame 204 can also include a third curved portion 244 as a sub-component. The third curved portion 244 is coupled (or formed) at one end to the first side member 216, and at the other, opposite end to the first cane 212. In the illustrated embodiment, the first hinge 224 is positioned between the first cane 212 and the third curved portion 244. Thus, the third curved portion 244 can be coupled (or formed) at one end to the first side member 216, and at the other, opposite end to the first hinge 224.

It should be appreciated that the first side frame 204 is a continuous or unitary component. While the first side frame 204 is described as a plurality of subcomponents, it should be appreciated that the first side frame 204 can be constructed (or formed) of a single, unitary member that includes the described subcomponents. Stated another way, the first cane 212, the first side member 216, and the first leg support member 220 can be formed as a continuous, unitary component.

It should also be appreciated that the first side frame 204 can be formed of carbon fiber to define a carbon fiber monotube. Thus, the carbon fiber first side frame 204 can include the first cane 212, the first side member 216, and the first leg support member 220, which can be molded together during the carbon fiber molding process to form the unitary first side frame 204. In addition, during the carbon fiber molding process, the first cane 212, the first side member 216, and the first leg support member 220 can be formed of a plurality of subcomponents as described that are molded together. In other embodiments, the first side frame 204 can include at least the first side member 216 and the first leg support member 220. In addition, the first side frame 204 can be formed of other materials (e.g., aluminum, titanium, a combination of materials, etc.).

With continued reference to FIG. 3, a first side guard 248 can be fastened to the first side frame 204. The first side guard 248 can be fastened to the first cane 212 and the first side member 216 by a respective fastener 252, 256 (e.g., a bolt, a screw, a threaded member, etc.). To facilitate collapsibility of the frame assembly 200 (e.g., for traveling in a vehicle, etc.), the first side guard 248 can include a channel 260. The channel 260 can include an elongated first channel portion 264 and a second channel portion 268 positioned at an angle to the first channel portion 264. In the non-collapsed (or extended) position, the fastener 252 is received within the second channel portion 268 (shown in FIG. 3). To transition to the collapsed position, the first side guard 248 rotates relative to an axis defined by the fastener 256, allowing fastener 252 to slide from the second channel portion 268 to the first channel portion 264. Once the fastener 252 is positioned in the first channel portion 264, the first cane 212 is configured to pivot at the first hinge 224, allowing the fastener 252 to travel along the first channel portion 264. These steps can be executed in reverse order to transition from the collapsed position to the non-collapsed (or extended) position. It should be appreciated that the side guard 248 and associated channel 260 can be custom fabricated to a suitable or desired size for a customized wheelchair 100, as discussed in additional detail below.

It should be appreciated that the second side frame 208 is substantially a mirror image of the first side frame 204. As such, the second side frame 208 includes the same components of the first side frame 204. To efficiently facilitate disclosure, and avoid repetition, the components of the second side frame 208 are illustrated in FIGS. 4-7 with the same identification numbers used in association with the first side frame 204, along with an "a." For example, the second side frame 208 includes a second cane 212*a*, a second side member 216*a*, and a second leg support member 220*a*. As another example, the second leg support member 220*a* includes a first curved portion 228*a*, a first elongated portion 232*a*, a second curved portion 236*a*, and a second elongated portion 240*a*. It should be appreciated that like number and like terms perform the same described function. In addition, for differentiation and clarity in the disclosure and claims when referencing components of the first and second side frames 204, 208, some components of the first side frame 204 can be further identified with the term "first," and some components of the second side frame 208 can be further identified with the term "second." For example, the first side frame 204 can include a first cane 212, a first side member 216, and a first leg support member 220, while the second side frame 208 can include a second cane 212*a*, a second side member 216*a*, and a second leg support member 220*a*.

Figure 5:
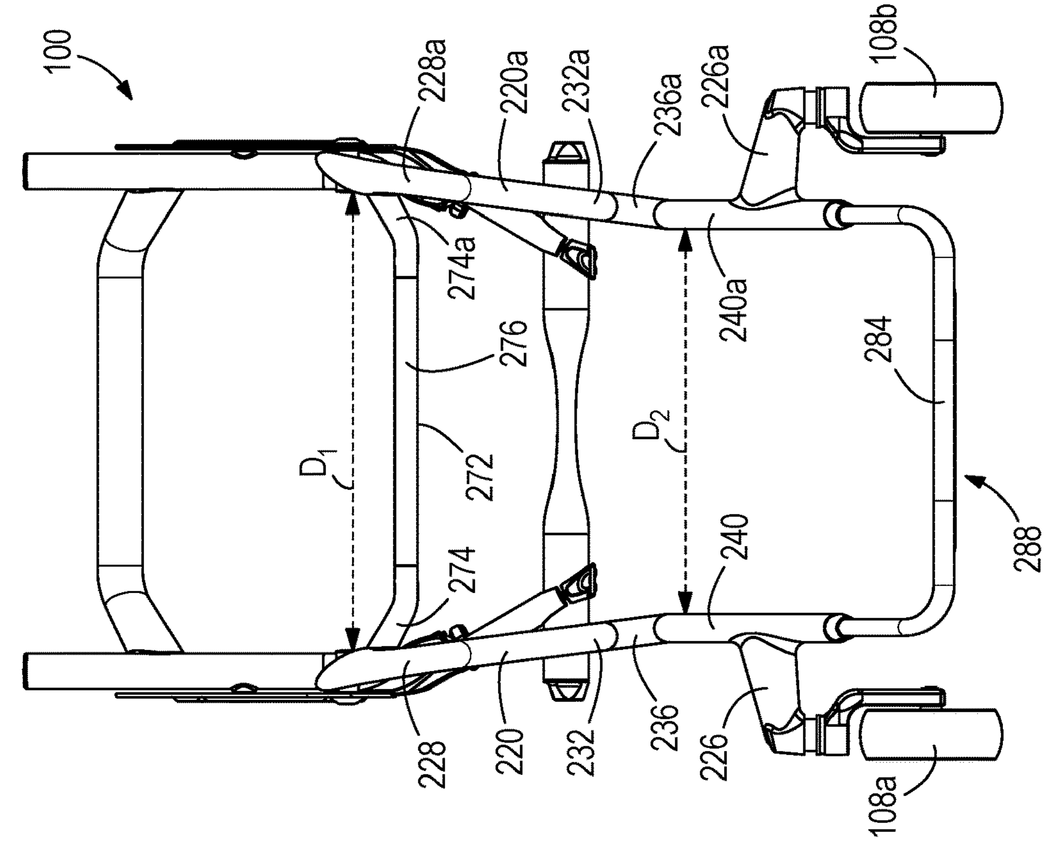
FIG. 5 is a front view of the frame assembly of FIG. 2.

With reference back to FIG. 2, a cross-member support 272 extends between the first side frame 204 and the second side frame 208. More specifically, the cross-member support 272 at a first end is coupled to the first side frame 204, and at a second, opposite end is coupled to the second side frame 208. With reference to FIGS. 2 and 5, the cross-member support 272 can include angled portions 274, 274*a* positioned at opposing ends of a central cross-member 276. The angled portions 274, 274*a* offset the central cross-member 276 from the first and second side members 204, 208. In embodiments where the cross-member support 272 is constructed of carbon fiber, the cross-member support 272 can be formed by pre-forming the central cross-member 276 and angled portions 274, 274*a*. The angled portions 274, 274*a* can then be bonded to each respective side member 216, 216*a*, coupling the cross-member support 272 to the first and second side frames 204, 208. In other embodiments, the angled portions 274, 274*a* can be molded into each respective side member 216, 216*a*. The central cross-member 276 is then bonded to the angled portions 274, 274*a* at each end, coupling the cross-member support 272 to the first and second side frames 204, 208. In other embodiments where the where the cross-member support 272 is constructed of other materials (e.g., aluminum, titanium, a combination of materials, etc.), the cross-member support 272 can be welded, fastened (e.g., by bolt, screw, etc.), or otherwise coupled to the first and second side frames 204, 208.

Figure 6:
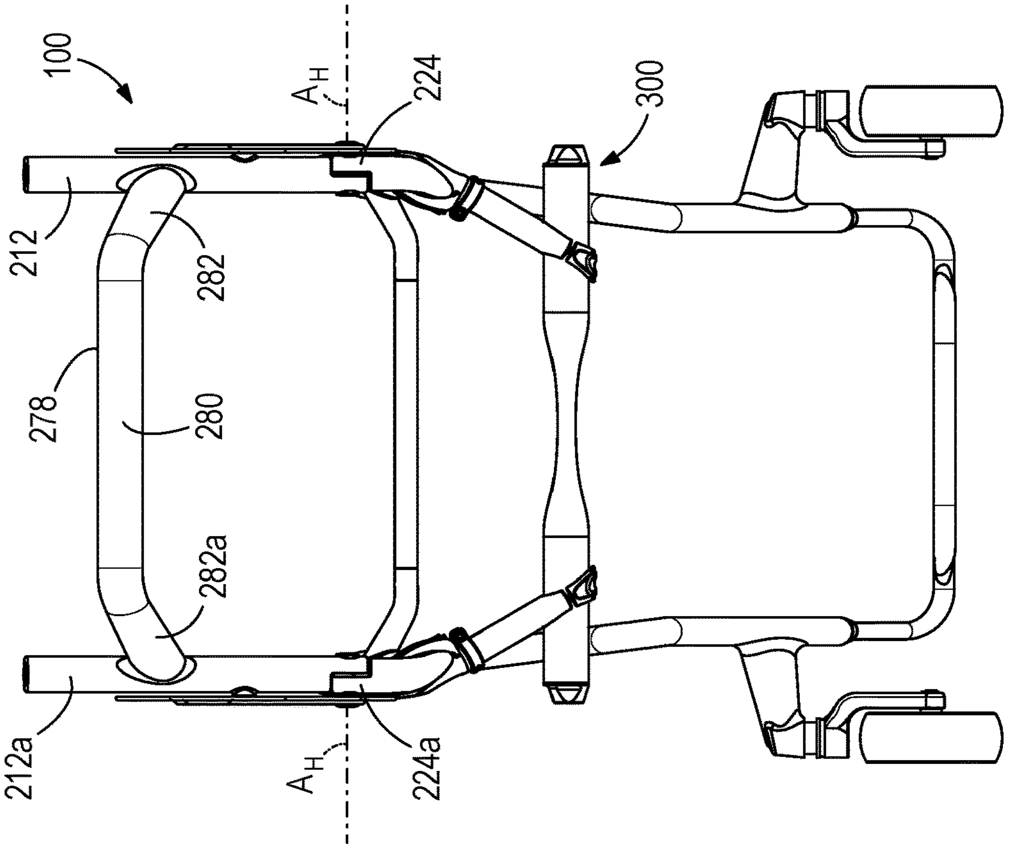
FIG. 6 is a rear view of the frame assembly of FIG. 2.

With reference back to FIG. 2, a cane cross-support 278 extends between the canes 212, 212*a* of the first and second side frames 204, 208. As shown in FIGS. 2 and 6, the cane cross-support 278 includes a central first member 280 and a pair of angled second members 282, 282*a*. The angled second members 282, 282*a* are respectively coupled to each end of the first member 280. The second members 282, 282*a* are also respectively coupled to one of the canes 212, 212*a*. The first member 280 is horizontally offset (or horizontally spaced) from the canes 212, 212*a* by the second members 282, 282*a*. In embodiments where the cane cross-support 278 is constructed of carbon fiber, the cane cross-support 278 can be formed by pre-forming the central first member 280 and the second members 282, 282*a*. The angled second members 282, 282*a* can then be bonded to each respective cane 212, 212*a* coupling the cane cross-support 278 to the canes 212, 212*a*. In other embodiments, the second members 282, 282*a* can be molded into each respective cane 212, 212*a*. The first member 280 can then be bonded to the second members 282, 282*a* at each end, coupling the cane cross-support 278 to the canes 212, 212*a*. In other embodiments where the where the cane cross-support 278 is constructed of other materials (e.g., aluminum, titanium, a combination of materials, etc.), the cane cross-support 278 can be welded, fastened (e.g., by bolt, screw, etc.), or otherwise coupled to the canes 212, 212*a*. It should be appreciated that the canes 212, 212*a* of the first and second side frames 204, 208, along with the cane cross-support 278, can collectively define the backrest assembly 214 (shown in FIG. 2).

Figure 4:
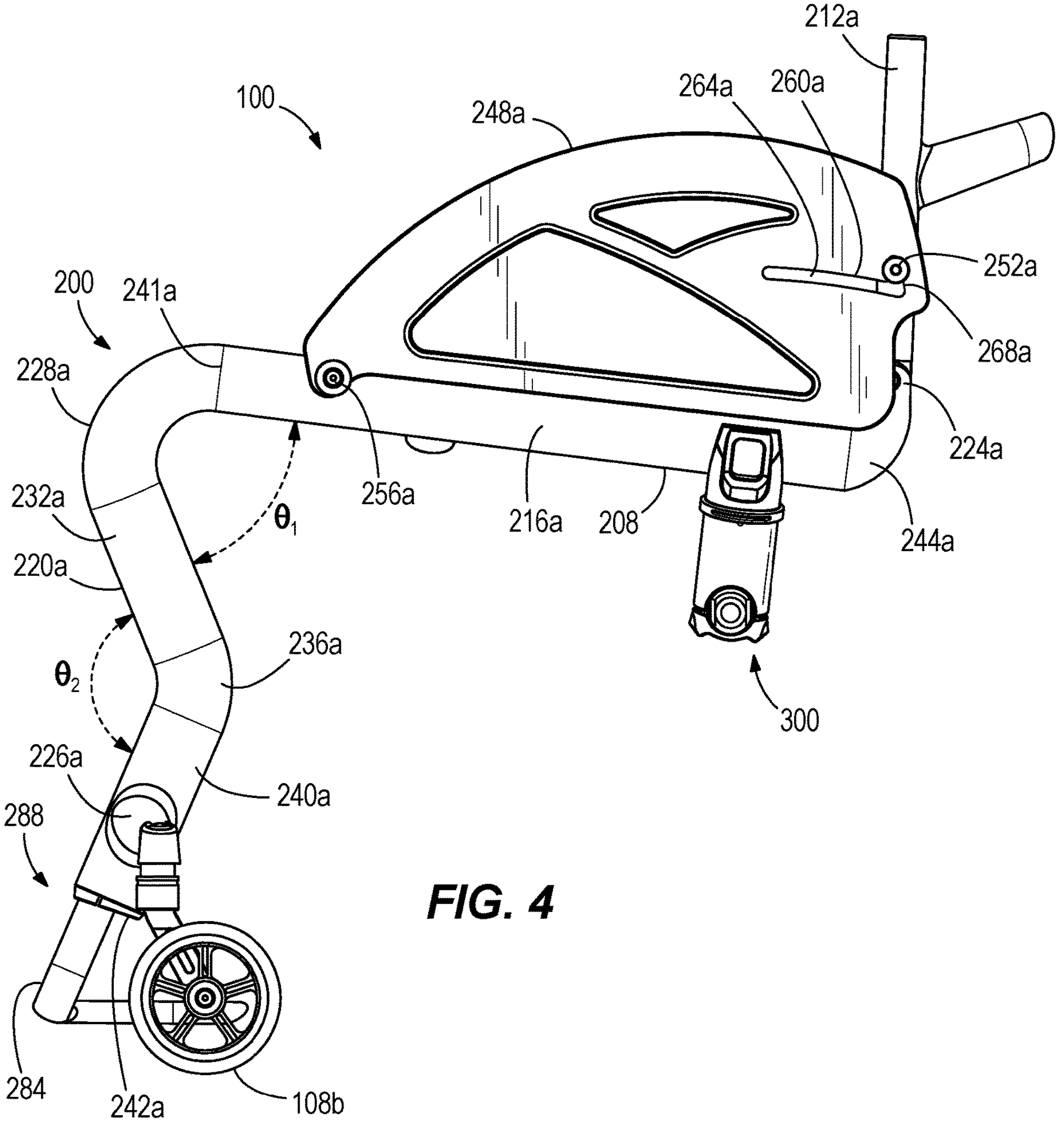
FIG. 4 is a second side view of the frame assembly of FIG. 2, opposite the first side.

With reference to FIGS. 2-4, a foot support 284 is coupled to the first and second leg support members 220, 220*a* of the first and second side frames 204, 208. The foot support 284 can be slidably received by the leg support members 220, 220*a* to facilitate adjustment of the foot support 284 relative to the leg support members 220, 220*a*. For example, each leg support member 220, 220*a* can include an aperture (not shown) that is configured to receive a portion of the foot support 284. Each aperture (not shown) can be positioned in the second end 242, 242*a* of each leg support member 220, 220*a*, and more specifically in the second elongated portion 240, 240*a* of the respective leg support members 220, 220*a*. It should be appreciated that the leg support members 220, 220*a* and the foot support 284 together define a leg support assembly 288.

With reference now to FIG. 5, the leg support assembly 288 includes a geometry to advantageously improve comfort and use of the wheelchair 100 by a user. As viewed from the front of the wheelchair 100, the leg support assembly 288 has a partial trapezoidal geometry such that the distance between the leg support members 220, 220*a* narrows from the first curved portions 228, 228*a* to the second elongated portions 240, 240*a* (and the foot support 284). A first distance $D_1$ extends between the first curved portions 228, 228*a*, while a second distance $D_2$ extends between the second elongated portions 240, 240*a*. The first distance $D_1$ is greater than the second distance $D_2$. The first distance $D_1$ is also parallel to the second distance $D_2$. The leg support assembly 288 geometry is partially trapezoidal as the leg support members 220, 220*a* define two legs of the trapezoid, while the foot support 284 defines the narrower of the trapezoid base.

Figure 7:
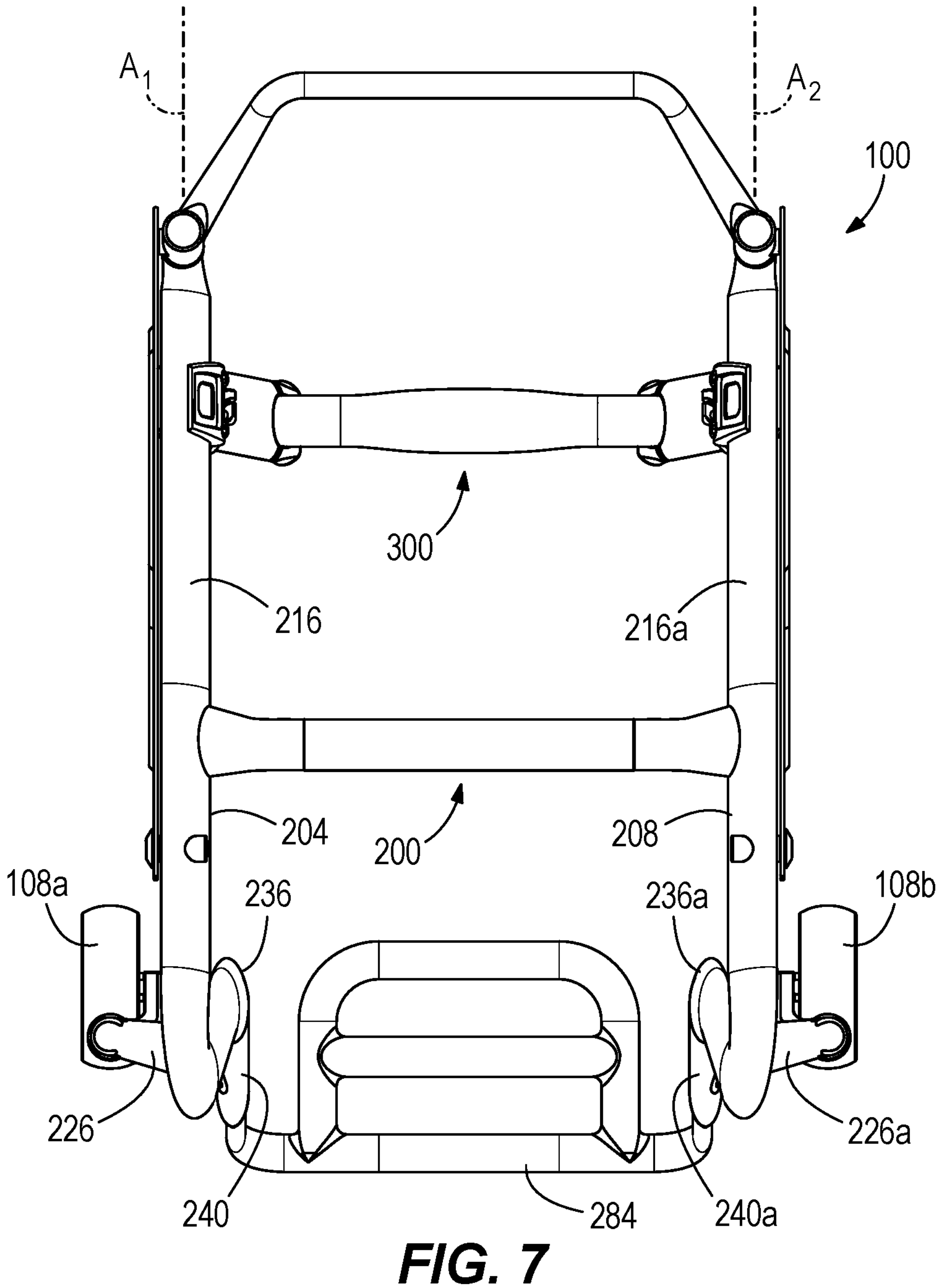
FIG. 7 is a plan view of the frame assembly of FIG. 2.
Figure 8:
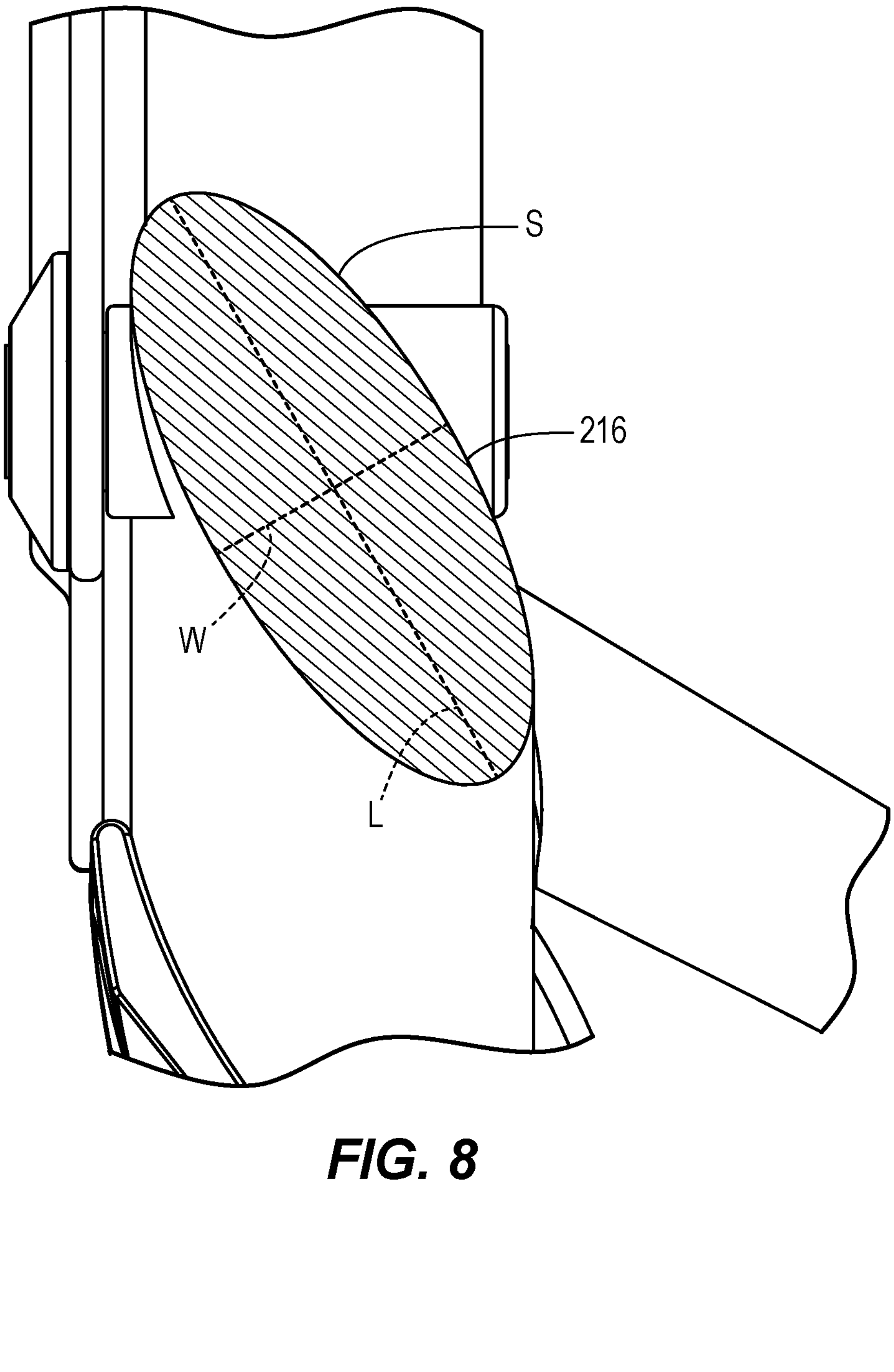
FIG. 8 is a cross-section of a side member of the frame assembly of FIG. 2, taken along line 8-8 of FIG. 3.

In the embodiment of the wheelchair 100 illustrated in FIGS. 1-7, the side members 216, 216*a* and the leg support members 220, 220*a* of the side frames 204, 208 have a unique cross-sectional geometry to provide improve comfort to a user of the wheelchair 100. With reference to FIG. 8, which is a cross-sectional view of the first side member 216 of the side frame 204, the side member 216 has an elliptical cross-sectional shape (or oblong cross-sectional shape or elliptical geometry). More specifically, the side member 216 includes a cross-sectional length L (or a major axis) and a cross-sectional width W (or a minor axis), where the length L is greater than the width W. The side member 216 is also oriented so that one of the elongated surfaces S (or sides S) faces the user. In the illustrated embodiment, the elliptical cross-sectional shape is rotated approximately thirty-degrees (30°) from vertical in a direction away from a user (or rotated towards the wheels 104). Stated another way, the cross-sectional length L is rotated approximately thirty-degrees (30°) from vertical away from the user (or rotated towards the wheels 104). In other examples of embodiments, the elliptical cross-sectional shape is rotated any suitable angular distance from vertical. This angular rotational orientation advantageously provides additional strength and stiffness for the side members 216, 216*a*. In addition, the angular rotational orientation advantageously provides additional surface area that can contact a user, improving user comfort during use by minimizing exposure to sharper curves or edges. While the elongated cross-sectional shape is illustrated in association with the first side member 216, the elongated cross-sectional shape is also incorporated into the second side member 216*a*. In addition, the elongated cross-sectional shape is incorporated into the leg support members 220, 220*a*, including the first curved portions 228, 228*a*, the first elongated portions 232, 232*a*, the second curved portions 236, 236*a*, and the second elongated portions 240, 240*a*. In other embodiments, the elongated cross-sectional shape can be incorporated into any portion or associated component of the frame assembly 200. In yet other embodiments, a first portion of the side frames 204, 208 can include the elliptical cross-sectional shape, while a second portion of the side frames 204, 208 can include a round cross-sectional shape. As a non-limiting example, the side member frames 204, 208 can include the elliptical cross-sectional shape and the leg support members 220, 220*a* can include a round cross-sectional shape.

Figure 9:
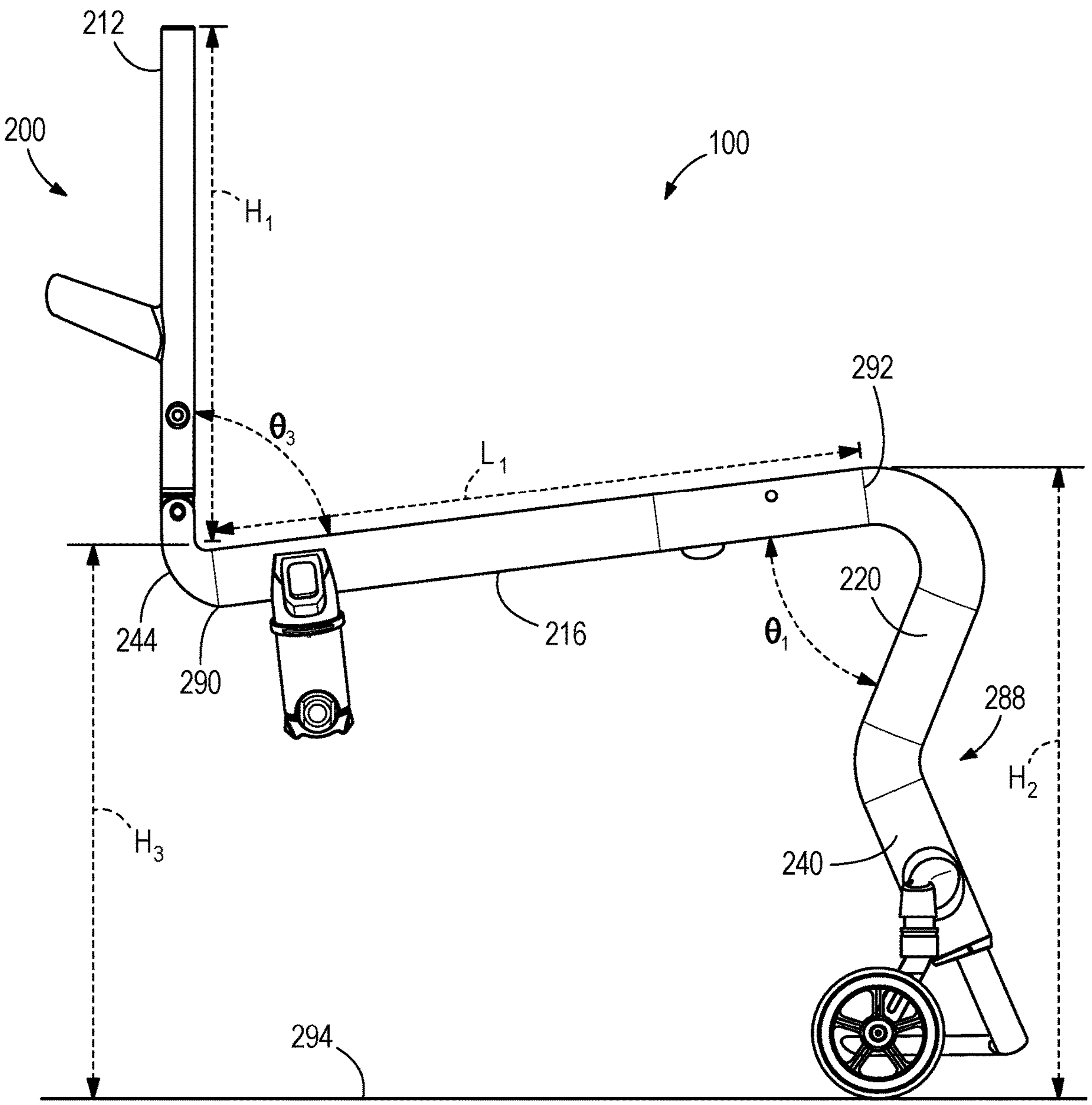
FIG. 9 is a side view of an embodiment of the frame assembly associated with the wheelchair of FIG. 1 with the rear wheels, seat support, back support, and side guard removed.

With reference now to FIG. 9, an embodiment of the wheelchair 100 is illustrated with the rear wheels 104, the seat support 112, the back support 116, and the side guards 248, 248*a* removed to better illustrated the frame assembly 200. The first side member 216 includes a first end 290 opposite a second end 292. The third curved portion 244 is coupled to the first end 290, and the leg support assembly 288 is coupled to the second end 292. More specifically the first leg support member 220 is coupled to the second end 292 of the first side member 216. The first side member 216 is oriented at an increasing slope from the first end 290 to the second end 292. The second end 292 is thus positioned further away from the ground 294 (or other surface upon which the wheelchair 100 is positioned) than the first end 290. Stated another way, the first end 290 of the first side member 216 is positioned closer to the ground 294 than the second end 292 of the first side member 216. Stated yet another way, an end of the first side member 216 coupled to the first cane 212 is positioned closer to the ground 294 than an opposite end of the first side member 216 coupled to the leg support assembly 288 (or the first leg support member 220). It should be appreciated that as a mirror image, the second side member 216*a* has the same orientation and slope as the first side member 216.

Figure 10:
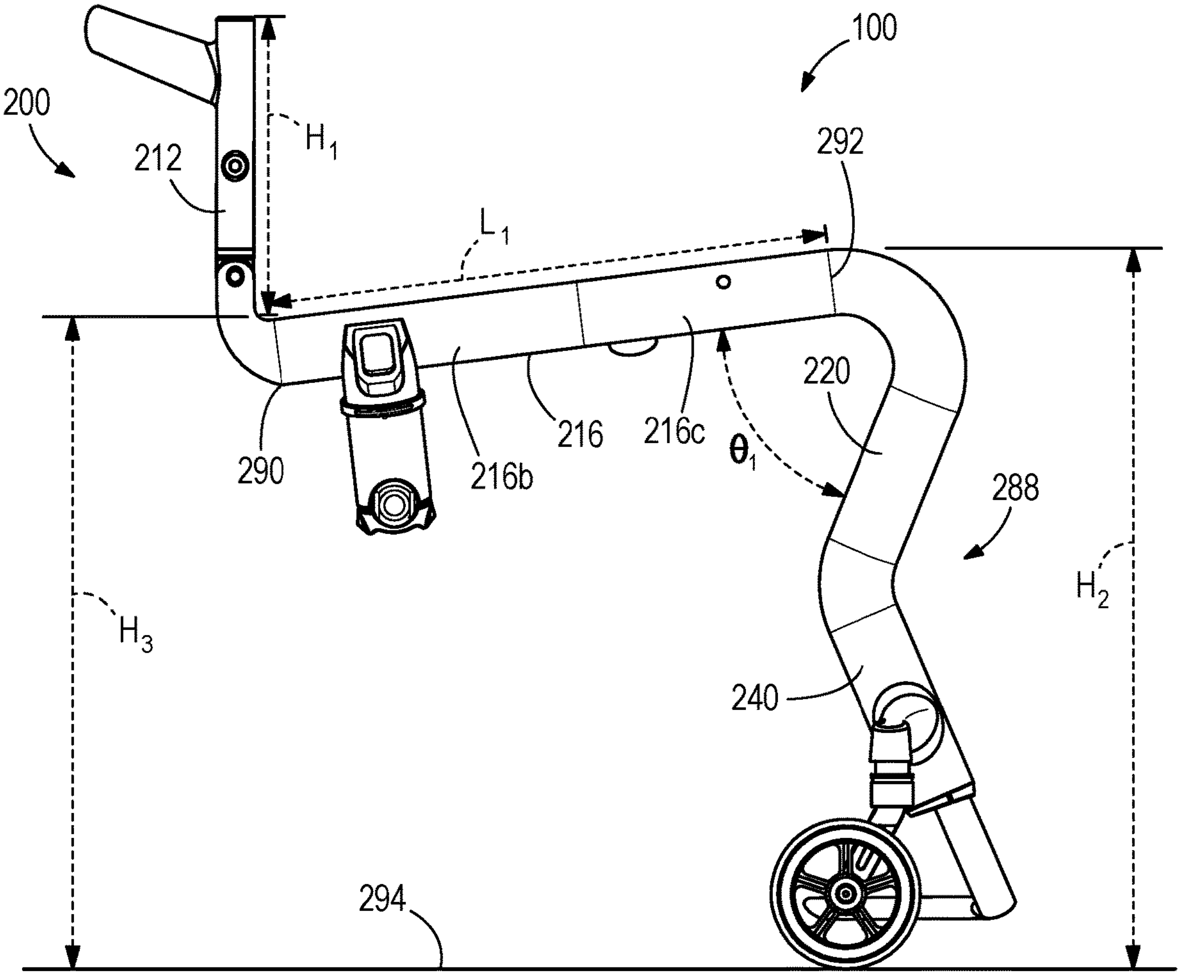
FIG. 10 is a side view of another embodiment of the frame assembly of FIG. 9 illustrating an alternative size of certain frame components.

The frame assembly 200 advantageously can be customized for a respective user. Customization may be desirable based on a body shape, a body size, or one or more other features of the user. With reference to FIGS. 9-10, the frame assembly can be customized in a plurality of aspects. In a first aspect, a first height $H_1$ that extends from the side member 216, 216*a* to an opposite end of the respective cane 212, 212*a* can be customized. The first height $H_1$ can correspond to a backrest height. In effect, the length of each cane 212, 212*a* can be customized to facilitate a properly sized, positioned, or fitting back support (not shown) relative to the user. As a non-limiting example, the first height $H_1$ can be from approximately eight (8) inches (shown in FIG. 10) to approximately seventeen (17) inches (shown in FIG. 9). In other examples of embodiments, the first height $H_1$ can be less than eight inches and greater than seventeen inches.

In a second aspect, a first length $L_1$ of the side member 216, 216*a* that extends from respective cane 212, 212*a* to the leg support member 220, 220*a* can be customized. The first length $L_1$ can correspond to a seat depth. In effect, the length of each leg support 220, 220*a* can be customized to facilitate a properly sized, positioned, or fitting seat support (not shown) relative to the user. In addition, the length of each leg support 220, 220*a* can be customized to properly position the leg support assembly 288 (or the leg support members 220, 220*a*) relative to the user. As a non-limiting example, the first length $L_1$ can be from approximately thirteen (13) inches (shown in FIG. 10) to approximately nineteen (19) inches (shown in FIG. 9). In other examples of embodiments, the first length $L_1$ can be less than thirteen inches and greater than nineteen inches. It should also be appreciated that each side member 216, 216*a* can be formed of a single member or a plurality of members 216*b*, 216*c* (shown in FIG. 10). The first length $L_1$ can be adjusted by increasing or reducing a length of one (or more) of the members 216*b*, 216*c*. As a non-limiting example, member 216*c* can be adjusted in length (e.g., reduced, cut, lengthened, etc.) before attachment to the associated leg support member 220, 220*a* to achieve a customized first length $L_1$ during assembly.

In a third aspect, a second height $H_2$ that extends from a second end 292 of the side member 216, 216*a* to the ground 294 can be customized. The second height $H_2$ can correspond to a height (or a length) of each leg support 220, 220*a*. In effect, the length of each leg support 220, 220*a* can be customized to properly position the leg support assembly 288 (or the leg support members 220, 220*a*) relative to the user. As a non-limiting example, the second height $H_2$ can be from approximately 17.4 inches (shown in FIG. 10) to approximately 20.9 inches (shown in FIG. 9). In other examples of embodiments, the second height $H_2$ can be less than 17.4 inches and greater than 20.9 inches. In the illustrated embodiment, the length of each leg support 220, 220*a* is adjusted by increasing (or decreasing) a length of the second elongated portions 240, 240*a*. In other examples of embodiments, the length of each leg support 220, 220*a* can be adjusted by increasing (or decreasing) a length of the first elongated portions 232, 232*a*, or a combination of both the first elongated portions 232, 232*a* and the second elongated portions 240, 240*a*.

In a fourth aspect, a third height $H_3$ that extends from a first end 290 of the side member 216, 216*a* to the ground 294 can be customized. The third height $H_3$ can correspond to a change in the first angle $\theta_1$. More specifically, as the first angle $\theta_1$ decreases, the third height $H_3$ decreases. Similarly, as the first angle increases, the third height $H_3$ increases. The first angle $\theta_1$ can be customized to properly orient a user relative to the wheelchair frame 200. As a non-limiting example, the third height $H_3$ can be from approximately 14.5 inches (shown in FIG. 10) to approximately 18.5 inches (shown in FIG. 9). In other examples of embodiments, the third height $H_3$ can be less than 14.5 inches and greater than 18.5 inches.

In a fifth aspect, a third angle $\theta_3$ (shown in FIG. 9) that extends between the side member 216, 216*a* and the respective cane 212, 212*a* can be customized. More specifically, the third curved portion 244 can be adjusted (or replace) to form the desired third angle $\theta_3$ between the cane 212, 212*a* and the attached side member 216, 216*a*. As a non-limiting example, the third angle $\theta_3$ can be an obtuse angle (greater than 90°), a right angle (90°), or an acute angle (less than) 90°. The third angle $\theta_3$ can be any suitable or desired angle desired by a user.

Figure 11:
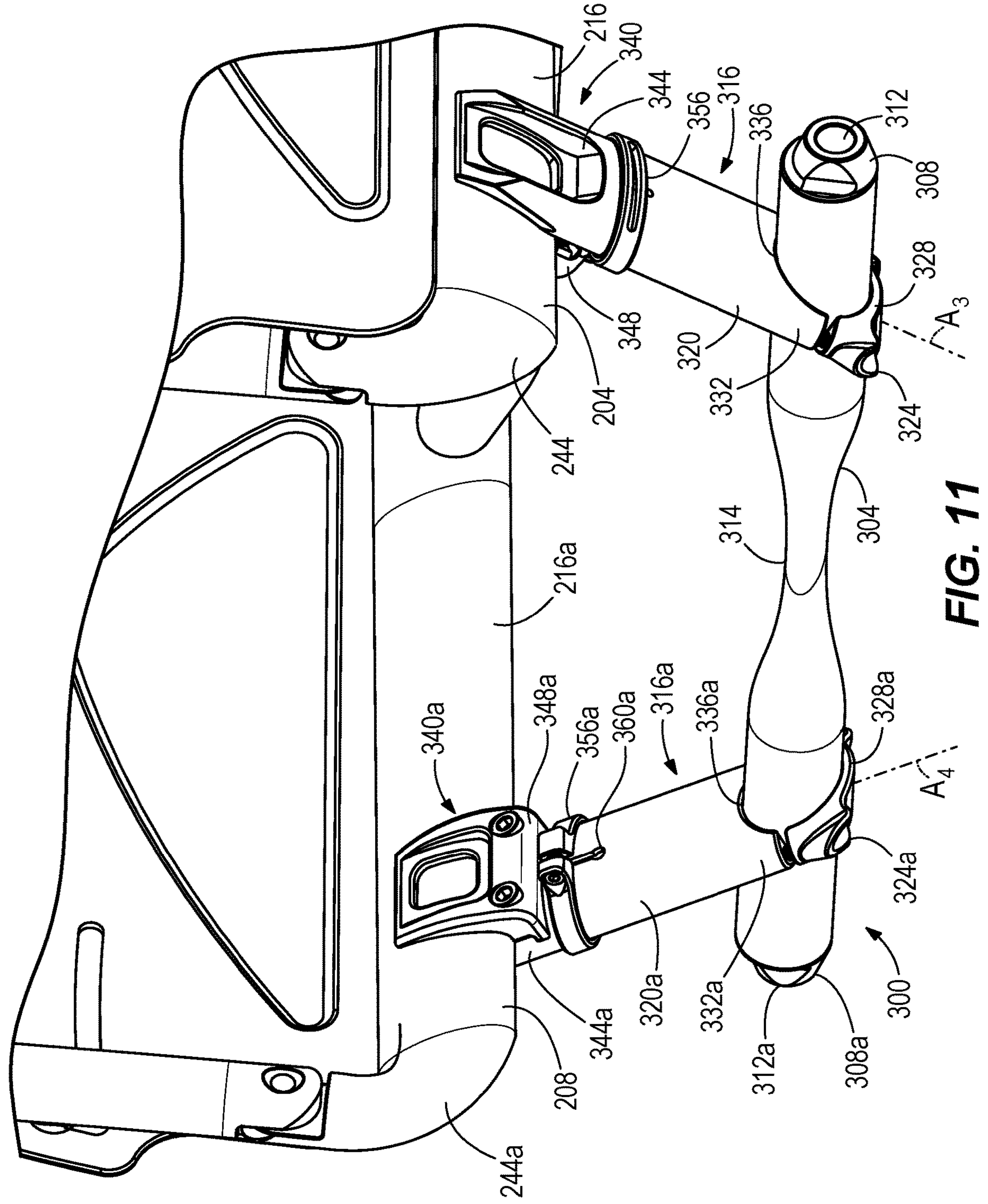
FIG. 11 is a perspective view of an example of an embodiment of an axle assembly of the frame assembly of FIG. 2, shown with the rear wheels removed.
Figure 12:
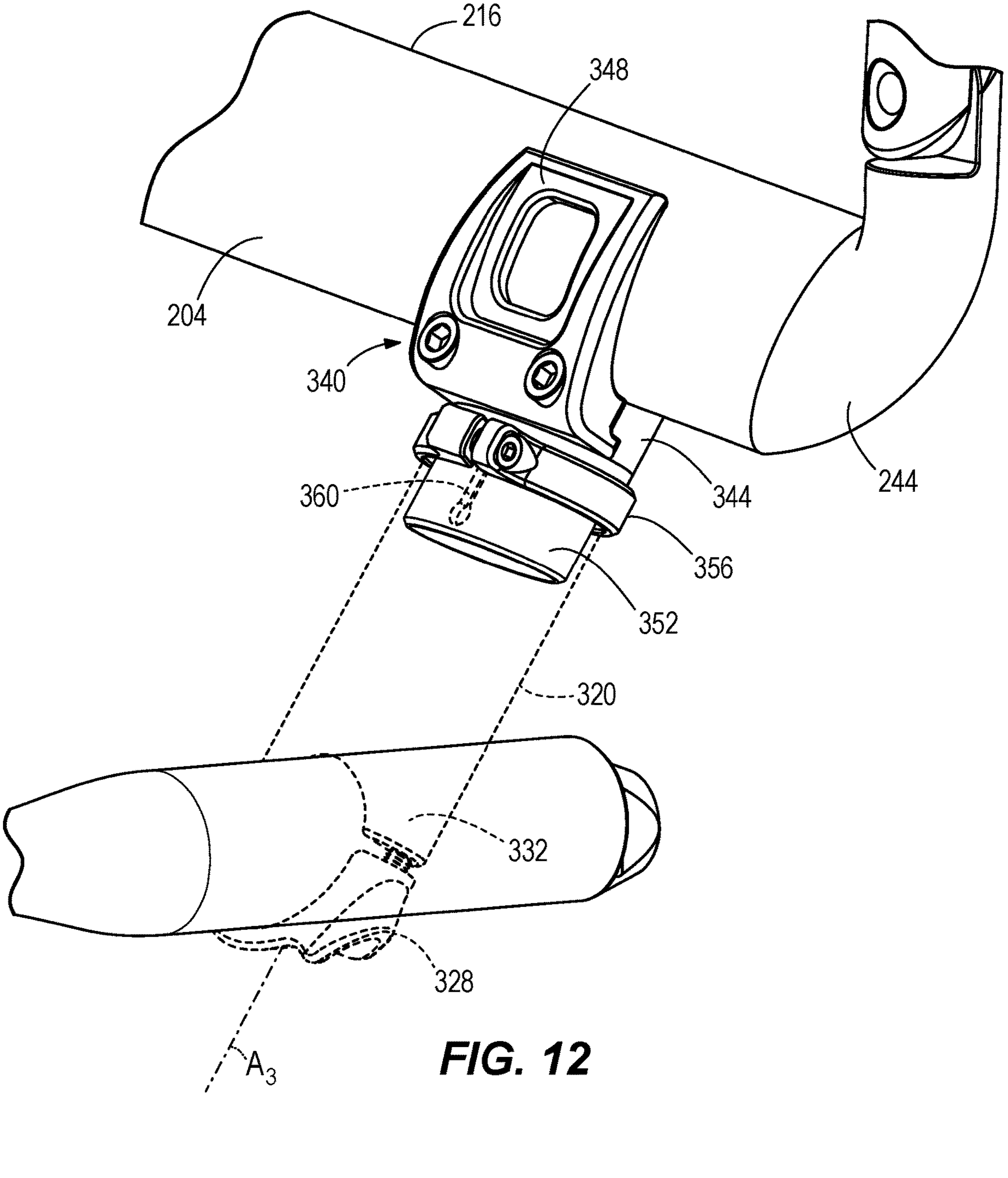
FIG. 12 is a perspective view of a portion of the axle assembly of FIG. 11, depicting a strut tube in broken lines to further illustrate components received by the strut tube.

Referring now to FIGS. 11-12, an embodiment of an axle assembly 300 is illustrated. The axle assembly 300 is selectively coupled to the frame assembly 200 (shown in FIG. 2). More specifically, the axle assembly 300 is selectively coupled to the first and second side frames 204, 208, and more specifically to the first and second side members 216, 216*a*. The axle assembly 300 provides for adjustability of a position of the wheels 104*a*, 104*b* (see FIG. 1) relative to the wheelchair 100, and specifically relative to the side members 216, 216*a*, by facilitating adjustability in at least two directions.

With specific reference to FIG. 11, the axle assembly 300 includes a camber tube 304. The camber tube 304 is configured to engage with the rear wheels 104*a, b* (shown in FIG. 1) of the wheelchair 100. More specifically, a first end 308 of the camber tube 304 includes a first channel 312 that is configured to receive a fastener (not shown) associated with the rear wheel 104*a*. The fastener couples the rear wheel 104*a* to the camber tube 304, while allowing the rear wheel 104*a* to rotate relative to the camber tube 304. A second end 308*a* of the camber tube 304, opposite the first end 308, includes a second channel 312*a* that is configured to receive a fastener (not shown) associated with the rear wheel 104*b*. The fastener couples the rear wheel 104*b* to the camber tube 304, while allowing the rear wheel 104*b* to rotate relative to the camber tube 304. The camber tube 304 also includes a center section 314 (or a center portion 314). The center section 314 has a narrower cross-sectional thickness than a cross-sectional thickness near the first and second ends 308, 308*a*. The narrower center section 314 provides for some flex in the camber tube 304, providing a suspension-like functionality.

A pair of strut assemblies 316, 316*a* mount the camber tube 304 to the first and second side frames 204, 208. The strut assemblies 316, 316*a* are inwardly swept relative to the first and second side members 216, 216*a*. The inwardly swept geometry can improve engagement with the orientation of the first and second side members 216, 216*a* (i.e., the oval cross-sectional shape of the side members 216, 216*a*). In other embodiments where the first and second side members 216, 216*a* have a circular cross-sectional shape, the strut assemblies 316, 316*a* can be inwardly swept relative to the first and second side members 216, 216*a*, or can be perpendicular relative to the first and second side members 216, 216*a*.

A first strut assembly 316 includes a first strut tube 320. A first camber tube bracket 324 mounts the camber tube 304 to the first strut tube 320. The first camber tube bracket 324 includes a first bracket portion 328 and a second bracket portion 332 that cooperate to engage with an outer circumference of the camber tube 304. A plurality of fasteners (e.g., bolts, screws, etc.) (not shown) selectively couple the first and second bracket portions 328, 332 together, and into engagement with the camber tube 304. It should be appreciated that the second bracket portion 332 is defined by an end of the first strut tube 320. The first and second bracket portions 328, 332 each partially define an aperture 336. The camber tube 304 is received by the aperture 336, with the first and second bracket portions 328, 332 drawn together to retain the camber tube 304 in the aperture 336. It should be appreciated that the first strut tube 320 is substantially hollow (shown in FIG. 12).

A first bracket assembly 340 mounts the first strut tube 320 to the first side member 216 of the first side frame 204. The first bracket assembly 340 includes a first clamp arm 344 and a second clamp arm 348. The first and second clamp arms 344, 348 cooperate to engage with opposing outer surfaces of the first side member 216. A plurality of fasteners (e.g., bolts, screws, etc.) (not shown) selectively couple the first and second clamp arms 344, 348 together, and into engagement with the side member 216. More specifically, the first and second clamp arms 344, 348 compress towards each other and against the side member 216. As specifically shown in FIG. 12, the first clamp arm 344 also includes a projection 352. The projection 352 is received by a second end of the substantially hollow first strut tube 320.

With reference back to FIGS. 11-12, the first strut assembly 316 also includes a strut clamp 356. The strut clamp 356 allows for selective positioning of the camber tube 304 along an axis defined by the first strut tube 320, which is discussed in additional detail below. The strut clamp 356 circumferentially surrounds the first strut tube 320 and applies an inwardly compressive force to selectively engage the first strut tube 320 with the projection 352 (shown in FIG. 12). The strut clamp 356 can include a fastener (e.g., a bolt, a screw, etc.) (not shown) to selectively couple the strut clamp 356 to the projection 352.

The second strut assembly 316*a* is substantially the same as the first strut assembly 316 and includes the same components. To efficiently facilitate disclosure, the components of the second strut assembly 316*a* are illustrated with the same identification numbers along with an "a." For example, the second strut assembly 316*a* includes a second strut tube 320*a*. To avoid repetition of the common components in association with the second strut assembly 316*a*, the components are identified in the figures, but the disclosure will not be repeated.

To facilitate adjustment (or repositioning) of the wheels 104*a*, 104*b* relative to the wheelchair 100, and specifically relative to the side members 216, 216*a*, the axle assembly 300 can be adjusted in at least two directions. In a first direction (or an X-direction), the axle assembly 300 can be moved along a length of the side members 216, 216*a*. With reference to FIG. 7, a first axis $A_1$ extends along a length of the first side member 216. A second axis $A_2$ extends along a length of the second side member 216*a*. Stated another way, the first side member 216 defines the first axis $A_1$, and the second side member 216*a* defines the second axis $A_2$. The first axis $A_1$ and the second axis $A_2$ are parallel to each other. The axle assembly 300 can be repositioned on the side members 216, 216*a* along the first and second axes $A_1$, $A_2$. More specifically, and with specific reference to FIG. 11, the first and second bracket assemblies 340, 340*a* can be respectively disengaged from the associated side member 216, 216*a* (e.g., by disengaging the fasteners, etc.). The axle assembly 300 can then be repositioned relative to the side members 216, 216*a* along the first and second axes $A_1$, $A_2$ (shown in FIG. 7) to a desired location (or a desired position). More specifically, the first and second bracket assemblies 340, 340*a* can slide relative to the respective the side members 216, 216*a* (or side frames 204*a*, 208*a*) to a desired position. Once repositioned, the first and second bracket assemblies 340, 340*a* can be respectively reengaged (or engaged) with the respective side member 216, 216*a* (e.g., by engaging/reengaging the fasteners, etc.).

In a second direction (or a Y-direction), the axle assembly 300 can be moved along an axis defined by the strut assemblies 316, 316*a*. Stated another way, the camber tube 304 can be moved closer to or further away from the side members 216, 216*a*. With reference to FIG. 11, a third axis $A_3$ extends along a length of the first strut assembly 316. A fourth axis $A_4$ extends along a length of the second strut assembly 316*a*. Stated another way, the first strut assembly 316 defines the third axis $A_3$, and the second strut assembly

316a defines the fourth axis $A_4$. Due to the inwardly swept geometry of the strut assemblies 316, 316a, the third and fourth axes $A_3$, $A_4$ intersect. The camber tube 304 can be repositioned closer to (or further away from) the side members 216, 216a along the third and fourth axes $A_3$, $A_4$.

In operation, to adjust the axle assembly 300 in the second direction, the first and second strut clamps 356, 356a can be respectively disengaged to allow the camber tube 304 to slide relative to the first and second bracket assemblies 340, 340a. In the embodiment of the axle assembly 300 shown in FIG. 11, disengagement of the first and second strut clamps 356, 356a allows the projection 352, 352a of the first and second bracket assemblies 340, 340a to slide within each respective strut tube 320, 320a. Stated another way, each respective strut tube 320, 320a can slide relative to the respective projection 352, 352a of the first and second bracket assemblies 340, 340a. Repositioning of the strut tube 320, 320a relative to the respective projection 352, 352a along the respective third or fourth axis $A_3$, $A_4$ moves the camber tube 304 closer to (or further away from) the side members 216, 216a. Once the camber tube 304 is moved to a desired position, the first and second strut clamps 356, 356a can be respectively reengaged (or engaged). It should be appreciated that each strut tube 320, 320a can define an elongated slot 360, 360a. The elongated slots 360, 360a can allow for compression of the respective strut tube 320, 320a into engagement with the respective projection 352, 352a in response to compressive force applied by the respective strut clamp 356, 356a. It should also be appreciated that the second direction (or Y-direction) of adjustment is perpendicular to the first direction (or X-direction) of adjustment, as the second direction is the distance towards (or away) from the side members 216, 216a of the first and second side frames 204, 208. Thus, the second direction (or Y-direction) can be perpendicular to the side members 216, 216a.

FIGS. 13-21 illustrate another embodiment of a wheelchair 100a. It should be appreciated that the wheelchair 100a is substantially similar to the wheelchair 100, with like identification numbers being used to identify like components. In addition, where necessary for clarity, certain components of wheelchair 100a are identified with the identification number followed by an "a." It should be appreciated that differences between the wheelchairs 100, 100a will be specifically identified, with new components being identified with new identification numbers. However, unless specifically identified, the wheelchair 100a and associated components will have similar functionality and advantages as the wheelchair 100 and associated components.

Figure 13:
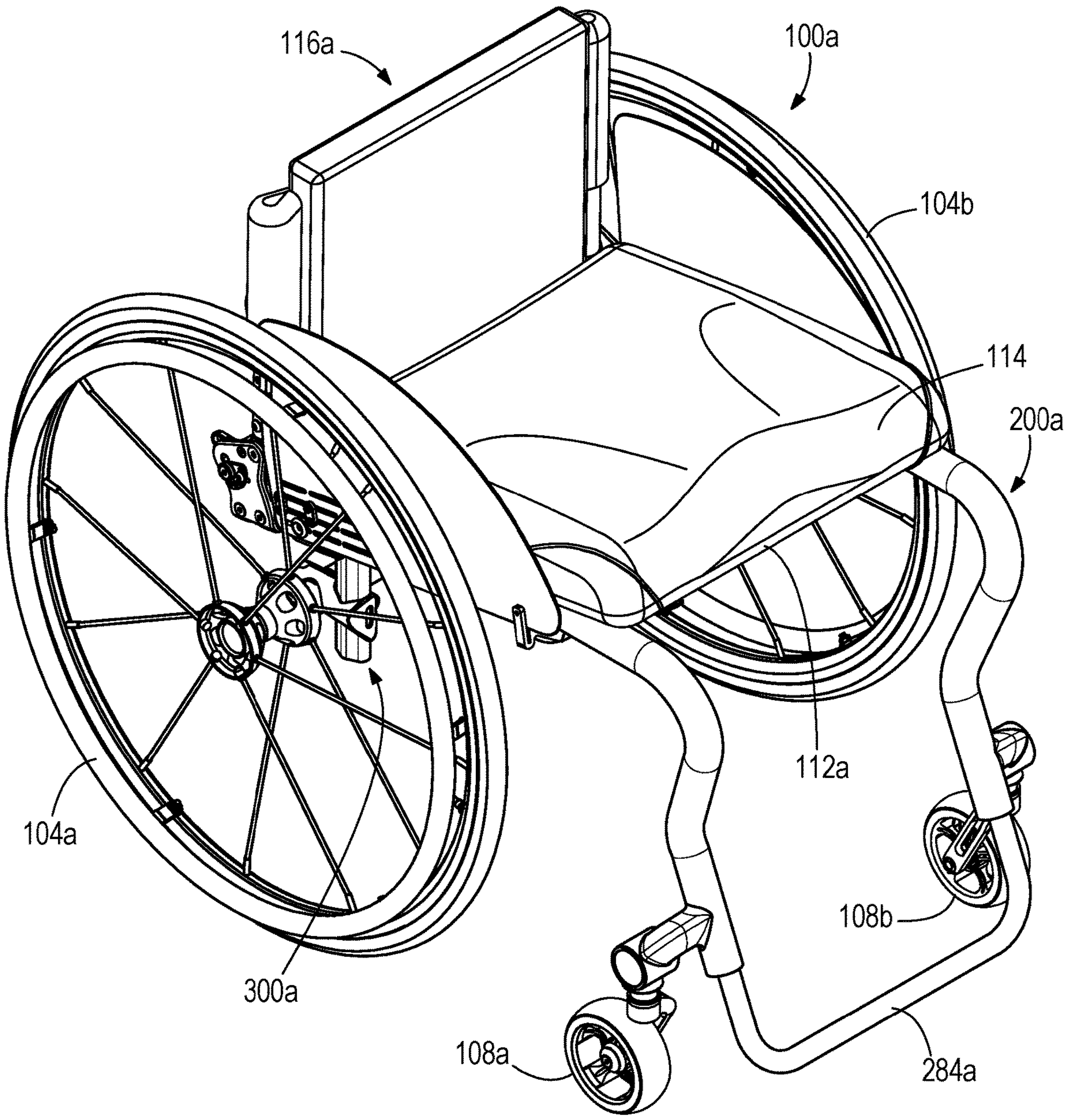
FIG. 13 is a perspective view of a wheelchair incorporating another example of an embodiment of a frame assembly.

With specific reference to FIG. 13, the wheelchair 100a includes a pair of rear wheels 104a, 104b (also referred to as drive wheels or first wheels 104a, 104b), a pair of caster wheels 108a, 108b (also referred to as casters or second wheels 108a, 108b), a seat support 112a (also referred to as a seat pan 112a), a seat cushion 114 position on the seat support 112a, a back support assembly 116a, a frame assembly 200a, and an axle assembly 300a. Each of the drive wheels 104a, *b* are coupled to the axle assembly 300a. The axle assembly 300a is coupled to the frame assembly 200a. The caster wheels 108a, *b* are also coupled to the frame assembly 200a. The seat support 112a and back support assembly 116a are respectively coupled (or fastened) to the frame assembly 200a.

Figure 14:
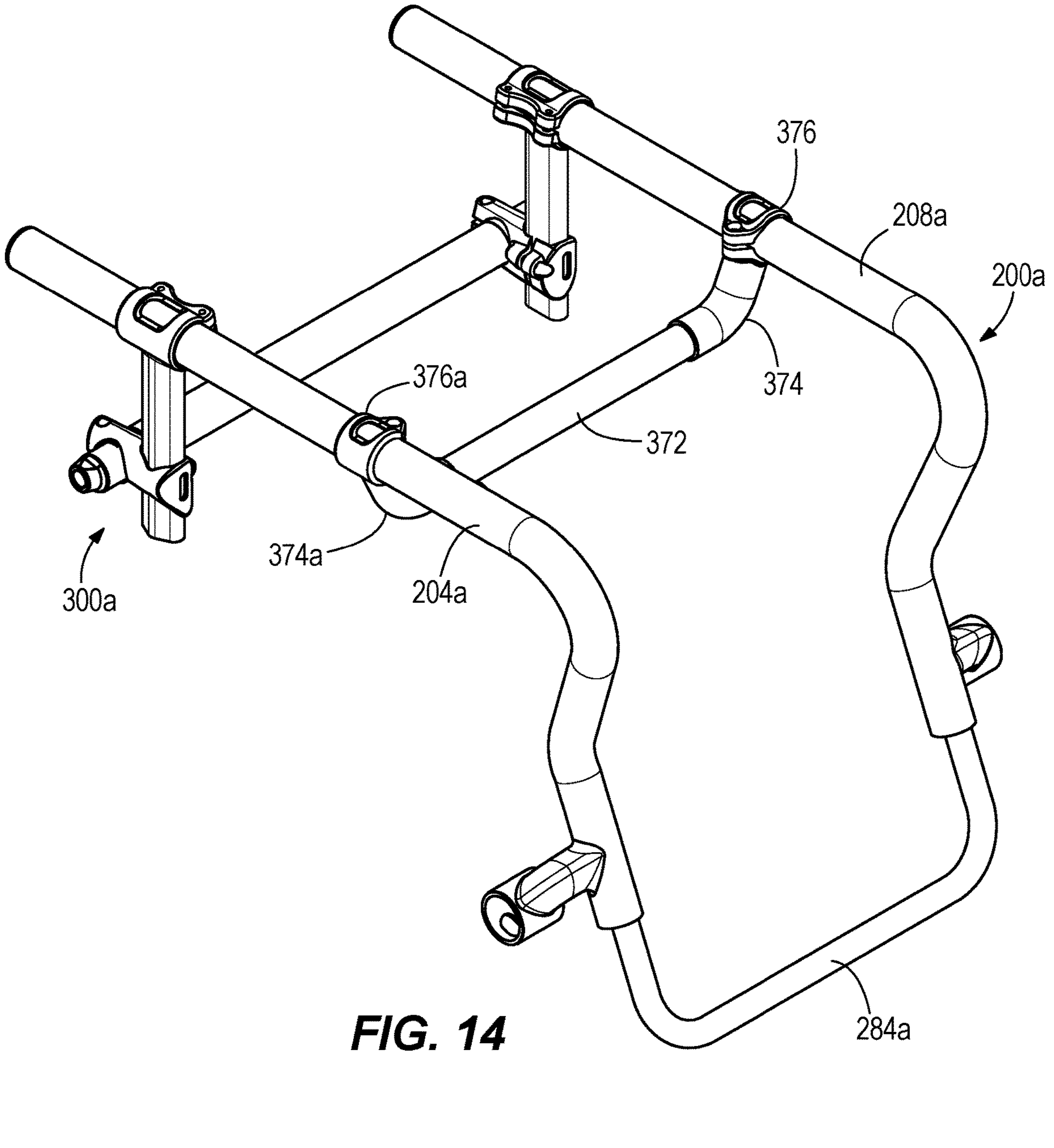
FIG. 14 is a perspective view of the frame assembly of the wheelchair of FIG. 13 with the rear wheels, seat support, back support, and caster wheels removed.

With reference now to FIGS. 14-18, the wheelchair 100a is shown with the rear wheels 104, the seat support 112, the back support 116, and a backrest assembly 214 removed to further illustrate the frame assembly 200a and the axle assembly 300a. With reference to FIG. 14, the frame assembly 200a includes a first side frame 204a and a second side frame 208a. The second side frame 208a is substantially a mirror image of the first side frame 204a. As such, the second side frame 208a includes the same components as the first side frame 204a. The components of the first and second side frames 204a, 208a are described and illustrated with the same identification numbers used in association with the first and second side frames 204, 208 of the frame assembly 200 of the wheelchair 100 above.

Figure 15:
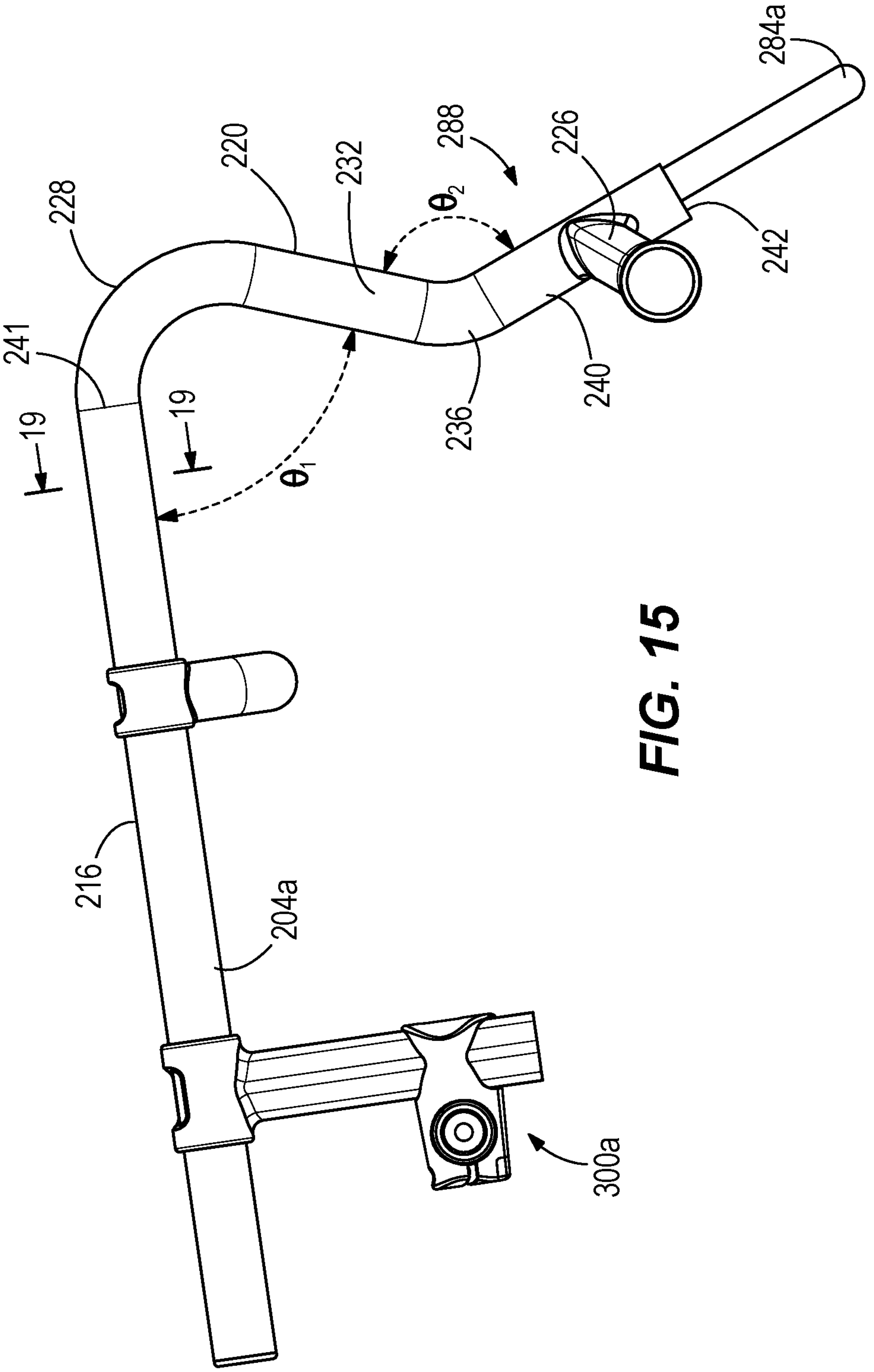
FIG. 15 is a first side view of the frame assembly of FIG. 14.
Figure 17:
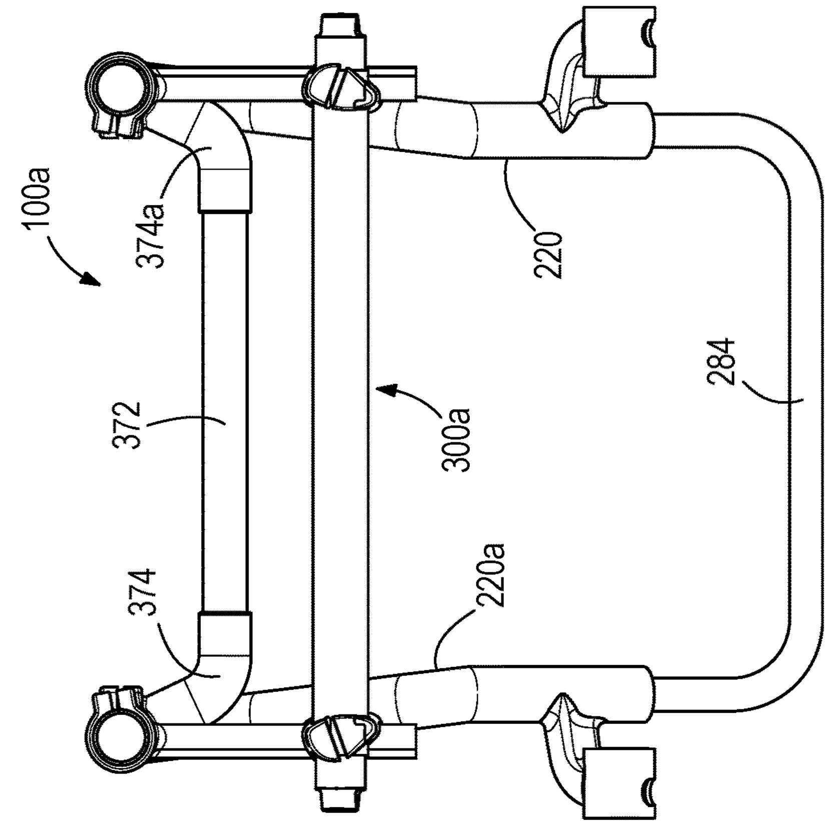
FIG. 17 is a rear view of the frame assembly of FIG. 14.

With specific reference to FIG. 15, the first side frame 204a includes a first side member 216 and a first leg support member 220. The first leg support member 220 is fastened (or coupled) to the first side member 216. A first mounting arm 226 (also referred to as a first caster mounting arm 226) is fastened to the first leg support member 220. The first mounting arm 226 is configured to rotatably couple the first caster wheel 108a to the first leg support member 220. The first mounting arm 226 extends outward and rearward from the first leg support member 220. Stated another way, the first mounting arm 226 extends away (or is horizontally offset) from the first leg support member 220 and is swept towards the axle assembly 300a.

The first leg support member 220 extends away from the first side member 216 and defines a plurality of curves. More specifically, the first leg support member 220 includes a first curved portion 228, a first elongated portion 232, a second curved portion 236, and a second elongated portion 240. The first curved portion 228 is coupled (or formed) at one end (or a first end) to the first side member 216, and at the other end (or a second end) to the first elongated portion 232. The second curved portion 236 is coupled (or formed) at one end (or a first end) to the first elongated portion 232, and at the other end (or a second end) to the second elongated portion 240. Accordingly, the first elongated portion 232 extends between (or is positioned between) the first and second curved portions 228, 236. The first curved portion 228, the first elongated portion 232, the second curved portion 236, and the second elongated portion 240 are consecutively connected (or consecutively formed) to define the leg support member 220. It should also be appreciated that the first side member 216 can be consecutively connected (or consecutively formed) with the first leg support member 220.

The first curved portion 228 has an arcuate portion that is oriented to curve in a first direction, and further defines a first angle $\theta_1$. The first angle $\theta_1$ extends between the first side member 216 and the first elongated portion 232. The first angle $\theta_1$ is positioned at the shortest distance between the first side member 216 and the first elongated portion 232. The first angle $\theta_1$ is an angle of less than ninety degrees. More specifically, the first angle $\theta_1$ is an angle in a range of approximately 45 degrees and approximately 70 degrees, and more specifically in a range of approximately 50 degrees and approximately 65 degrees, and more specifically in a range of approximately 55 degrees and approximately 61 degrees. Stated another way, the first angle $\theta_1$ is an acute angle. The first angle $\theta_1$ is positioned on a first side of the first leg support member 220. In the illustrated embodiment, the first side of the first leg support member 220 faces the back side (or the back end) of the wheelchair 100

The second curved portion 236 includes an arcuate portion that is oriented to curve in a second direction, and further defines a second angle $\theta_2$. The second angle $\theta_2$ extends between the first elongated portion 232 and the second elongated portion 240. The second angle $\theta_2$ is positioned at the shortest distance between the first elongated portion 232 and the second elongated portion 240. The second angle $\theta_2$ is an angle of more than ninety degrees.

More specifically, the second angle $\theta_2$ is an angle in a range of approximately 115 degrees and approximately 155 degrees, and more specifically in a range of approximately 125 degrees and approximately 145 degrees, and more specifically is approximately 135 degrees. Stated another way, the second angle $\theta_2$ is an obtuse angle. The second angle $\theta_2$ is positioned on a second side of the first leg support member 220, opposite the first side. In the illustrated embodiment, the second side of the first leg support member 220 faces the front side (or the front end) of the wheelchair 100. Stated another way, the first angle $\theta_1$ and the second angle $\theta_2$ are positioned on opposite sides of the first leg support member 220. Stated yet another way, the curve defined by the first angle $\theta_1$ and the curve defined by the second angle $\theta_2$ are oriented to curve in different directions, and more specifically in opposite directions. In the illustrated embodiment, the first angle $\theta_1$ faces towards the axle assembly 300*a*, while the second angle $\theta_2$ faces away from the axle assembly 300*a*. Stated another way, the first angle $\theta_1$ faces towards the first side member 216, while the second angle $\theta_2$ faces away from the first side member 216.

The first curved portion 228 and the second curved portion 236 cooperate to provide the first leg support member 220 with a serpentine geometry (also referred to as a double curve geometry). As shown in FIG. 15, the first leg support member 220 thus includes a plurality of curved portions 228, 236 positioned between a first end 241 and a second end 242 of the first leg support member 220. The first end 241 couples to the first side member 216, while the second end 242 is opposite the first end 241. The serpentine geometry (or double curve geometry) is positioned between the first and second ends 241, 242 of the first leg support member 220. Stated another way, the first leg support member 220 includes a plurality of angles, and more specifically a plurality of different angles when viewed from the side. The plurality of angles includes a backward sweep defined by the first curved portion 228 such that the first elongated portion 232 extends from the first curved portion 228 towards the back of the wheelchair 100. The plurality of angles also includes a forward sweep defined by the second curved portion 236 such that the second elongated portion 240 extends from the second curved portion 228 towards the front of the wheelchair 100. This geometry advantageously orients the first curved portion 228 (or a top of the first leg support member 220) in an offset vertical alignment with the caster wheel 108*a*. The forward sweep defined by the second curved portion 236 and second elongated portion 240 allows for the first mounting arm 226 to extend outward and rearward relative to the second elongated portion 240 (see FIG. 15). When viewed from the side, as shown in FIG. 15, the first mounting arm 226 is positioned at an oblique angle to the second elongated portion 240. In the illustrated embodiment, this non-orthogonal angle formed between the first mounting arm 226 and the second elongated portion 240 allows for the caster wheel 108*a* to be positioned further rearward (or closer to the axle assembly 300*a* or closer to the first side member 216 or rearward swept) than a traditional wheelchair side frame with a vertically straight leg support member. The vertical alignment of the caster wheel 108*a* and the first curved portion 228, along with the serpentine geometry of the leg support member 220 and the rearward swept caster wheel 108*a* (by the mounting arm 226) advantageously provides improved maneuverability of the wheelchair 100*a*. This allows a user to move the wheelchair 100*a* into tight spaces, as the geometry moves the leg support member 220 out of potential contact (or potential impact) of objects in the environment. In addition, the geometry allows a user to move the wheelchair closer to an object. This provides for easier and safer transfers into and out of the wheelchair 100*a* (e.g., transfer between the wheelchair 100*a* and another location, such as a toilet, car, bed, etc.). It should be appreciated that the first side frame 204*a* is a continuous or unitary component. While the first side frame 204*a* is described as a plurality of subcomponents, it should be appreciated that the first side frame 204*a* can be constructed (or formed) of a single, unitary member that includes the described subcomponents. Stated another way, the first side member 216 and the first leg support member 220 can be formed as a continuous, unitary component. It should also be appreciated that the first side frame 204*a* can be formed of metal, such as aluminum. In addition, the first side frame 204 can be formed of other materials (e.g., aluminum, titanium, a combination of materials, etc.).

As previously indicated, the second side frame 208*a* is substantially a mirror image of the first side frame 204*a*. As such, the second side frame 208*a* includes the same components of the first side frame 204*a*. For example, the second side frame 208*a* includes a second cane 212*a*, a second side member 216*a*, and a second leg support member 220*a*. As another example, the second leg support member 220*a* includes a first curved portion 228*a*, a first elongated portion 232*a*, a second curved portion 236*a*, and a second elongated portion 240*a*.

Figure 18:
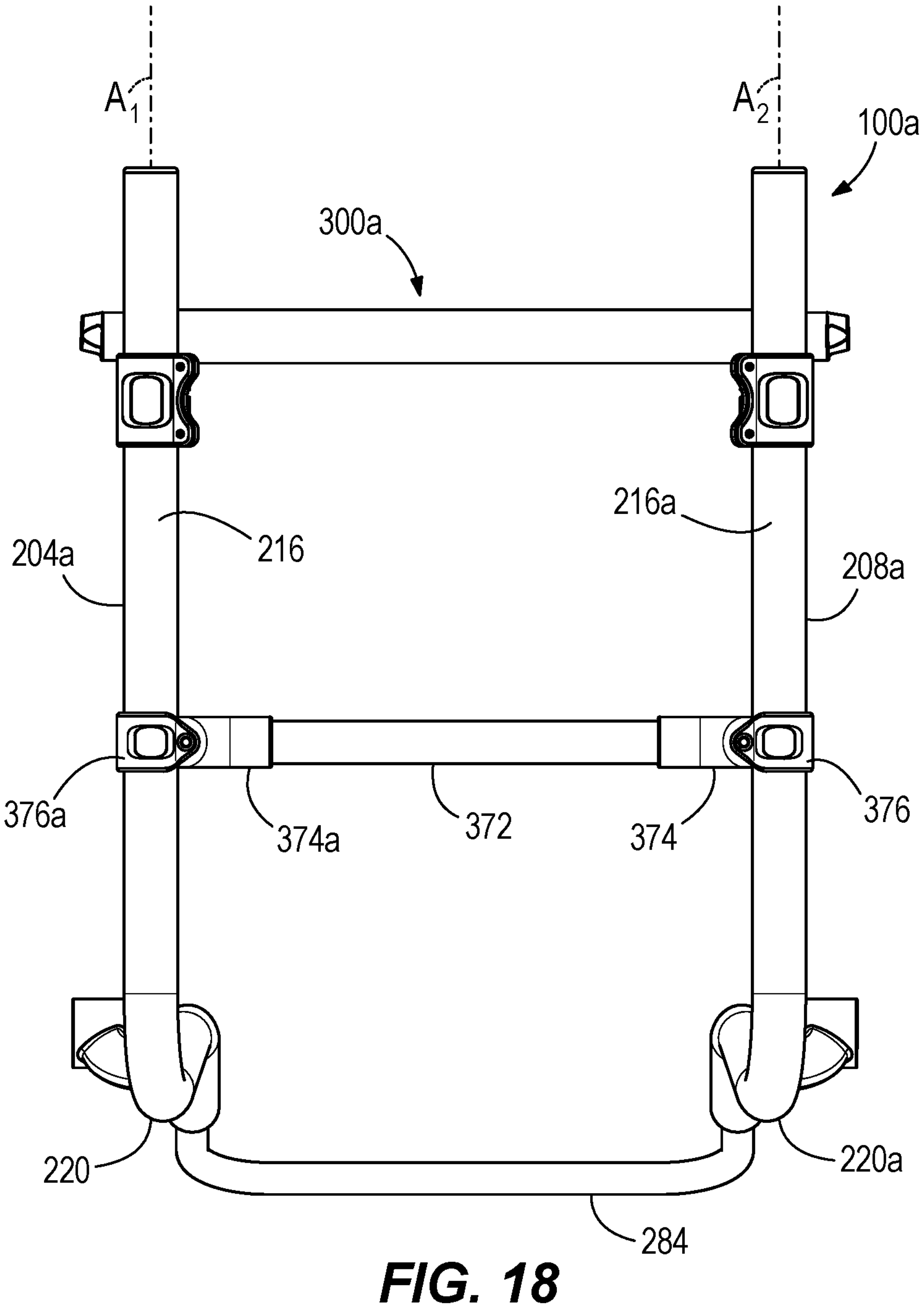
FIG. 18 is a plan view of the frame assembly of FIG. 14.

With reference back to FIG. 14, a cross-member support 372 extends between the first side frame 204*a* and the second side frame 208*a*. More specifically, the cross-member support 372 at a first end is coupled to the first side frame 204*a*, and at a second, opposite end is coupled to the second side frame 208*a*. With reference to FIGS. 14 and 18, the cross-member support 372 can be a tubular member. The cross-member support 372 can further include an attachment member 374, 374*a* positioned at each end of the cross-member support 372 to facilitate a connection to the respective side frame 204*a*, 208*a*. As illustrated, the attachment members 374, 374*a* are substantially same. In the illustrated embodiment, each attachment member 374, 374*a* is tubular and configured to slidably receive the cross-member support 372. Each attachment member 374, 374*a* also defines a clamp assembly 376, 376*a*. Each clamp assembly 376, 376*a* includes clamp arms that are configured to engage (or circumferentially surround) a portion of the respective side frame 204*a*, 208*a*. Once engaged, the clamp arms are fastened together by at least one fastener (e.g., a bolt, a screw, etc.) (not shown). As the fastener is tightened, the clamp arms compress towards each other, applying a clamping force (or compressive force) onto the respective side frame 204*a*, 208*a* to facilitate coupling of the cross-member support 372 to the side frames 204*a*, 208*a*.

With reference to FIGS. 13-16, a foot support 284*a* is coupled to the first and second leg support members 220, 220*a* of the first and second side frames 204, 208. The foot support 284*a* can be slidably received by the leg support members 220, 220*a* to facilitate adjustment of the foot support 284 relative to the leg support members 220, 220*a*. For example, and with reference to FIG. 16, each leg support member 220, 220*a* can include an aperture (not shown) that is configured to receive a portion of the foot support 284. Each aperture (not shown) can be positioned in the second end 242, 242*a* of each leg support member 220, 220*a*, and more specifically in the second elongated portion 240, 240*a* of the respective leg support members 220, 220*a*. It should be appreciated that the leg support members 220, 220*a* and the foot support 284 together define a leg support assembly 288.

Figure 16:
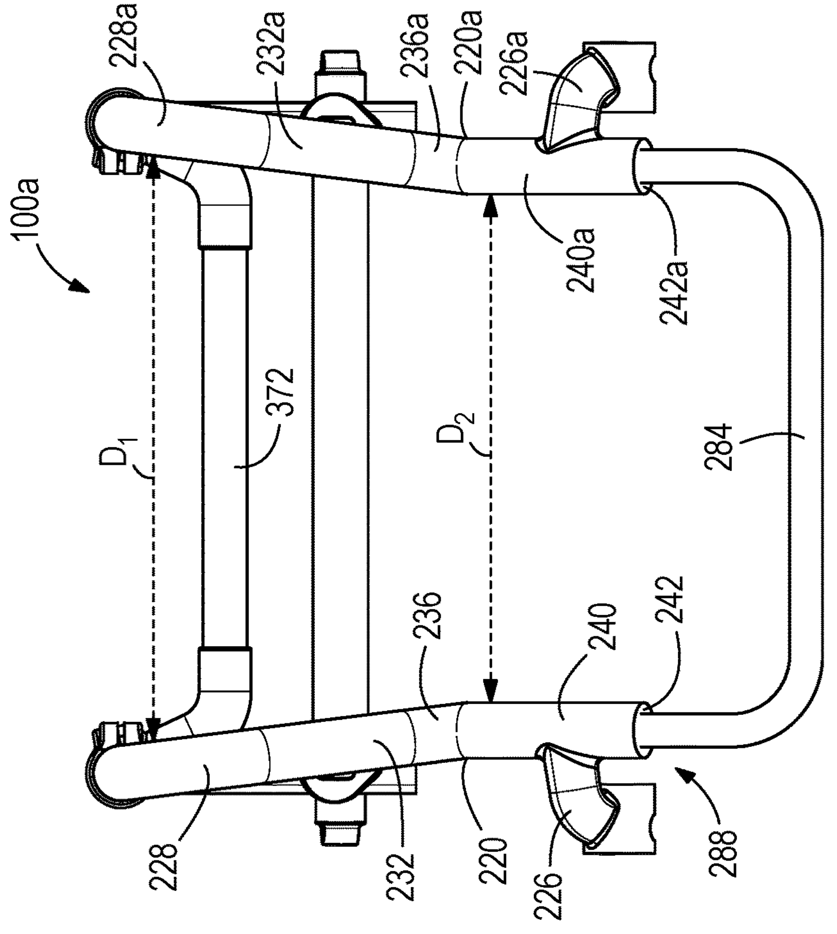
FIG. 16 is a front view of the frame assembly of FIG. 14.

With reference now to FIG. 16, the leg support assembly 288 includes a geometry to advantageously improve comfort and use of the wheelchair 100*a* by a user. As viewed from the front of the wheelchair 100*a*, the leg support assembly 288 has a partial trapezoidal geometry such that the distance between the leg support members 220, 220*a* narrows from the first curved portions 228, 228*a* to the second elongated portions 240, 240*a* (and the foot support 284). A first distance $D_1$ extends between the first curved portions 228, 228*a*, while a second distance $D_2$ extends between the second elongated portions 240, 240*a*. The first distance $D_1$ is greater than the second distance $D_2$. The first distance $D_1$ is also parallel to the second distance $D_2$. The leg support assembly 288 geometry is partially trapezoidal as the leg support members 220, 220*a* define two legs of the trapezoid, while the foot support 284 defines the narrower of the trapezoid base.

Figure 19:
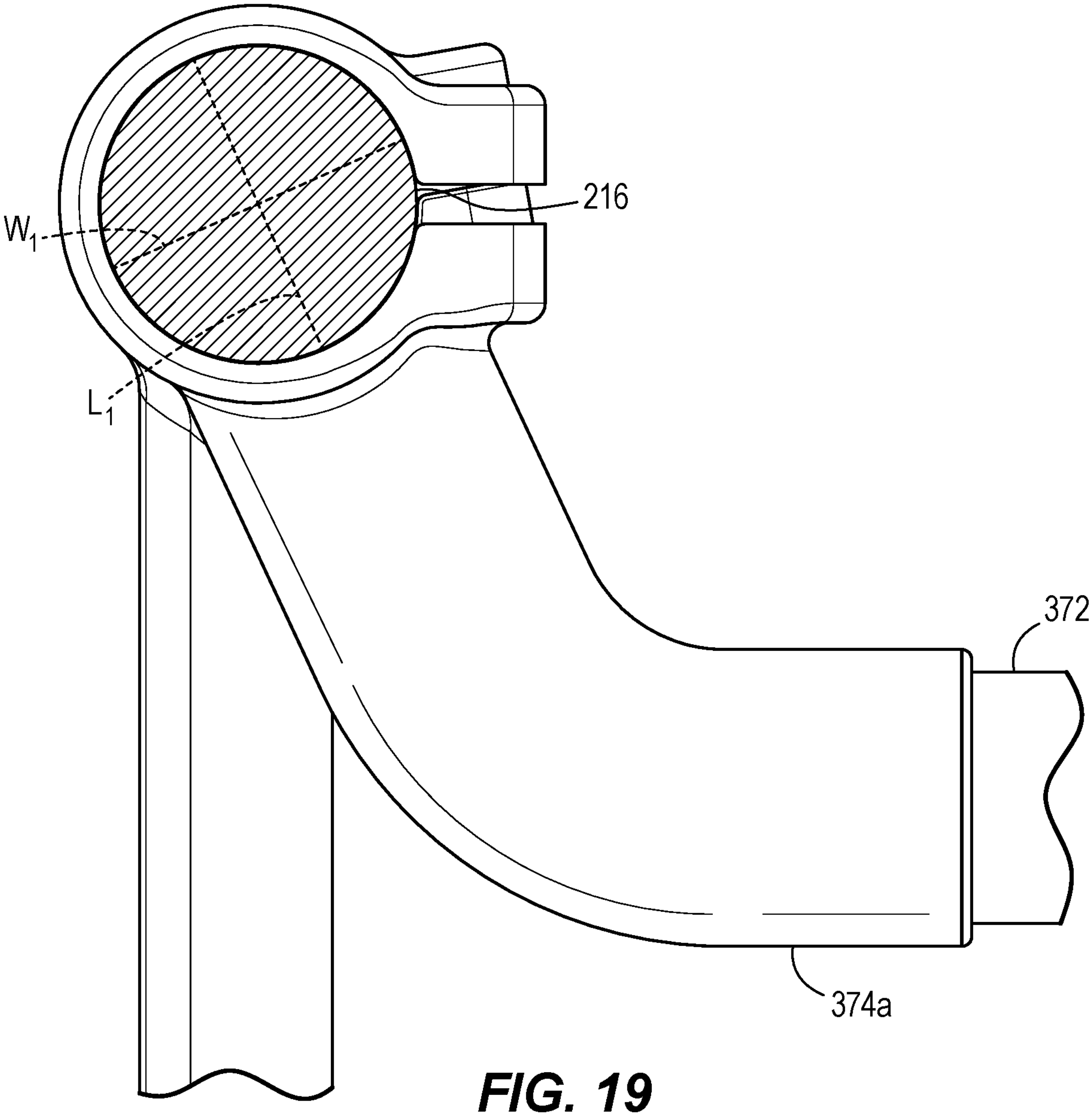
FIG. 19 is a cross-section of a side member of the frame assembly of FIG. 14, taken along line 19-19 of FIG. 15.

In the embodiment of the wheelchair 100*a* illustrated in FIGS. 14-19, the side members 216, 216*a* and the leg support members 220, 220*a* of the side frames 204*a*, 208*a* have a unique cross-sectional geometry to provide improve comfort to a user of the wheelchair 100. With reference to FIG. 19, which is a cross-sectional view of the first side member 216 of the side frame 204*a*, the side member 216 has a circular cross-sectional shape (or round cross-sectional shape or circular geometry). More specifically, the side member 216 includes a cross-sectional length $L_1$ and a cross-sectional width $W_1$, where the length $L_1$ is the same as the width $W_1$. Stated another way, the length $L_1$ and the width $W_1$ are both cross-sectional diameters having a same distance.

Figure 20:
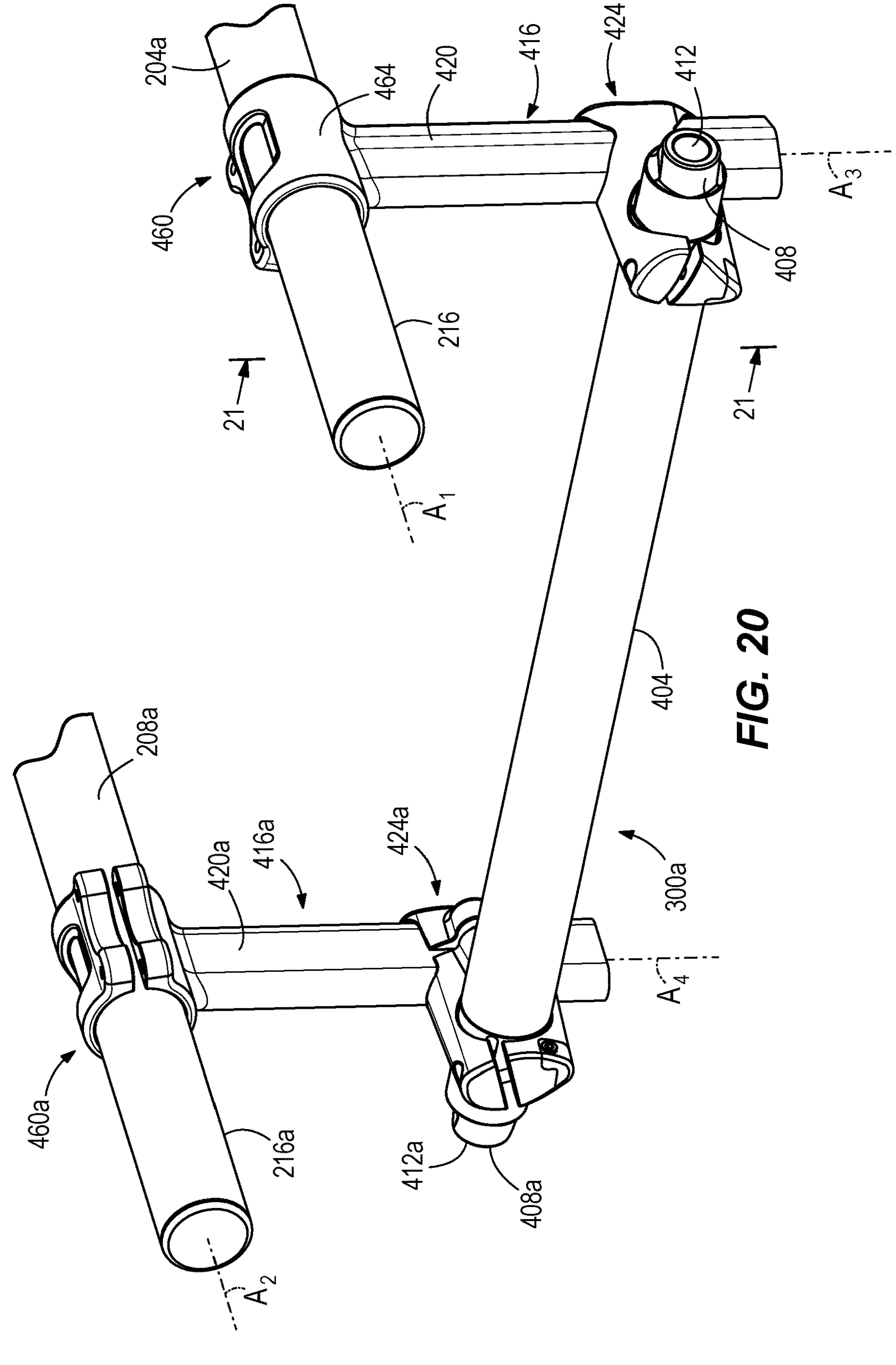
FIG. 20 is a perspective view of another example of an embodiment of an axle assembly of the frame assembly of FIG. 14, shown with the rear wheels and back support removed.
Figure 21:
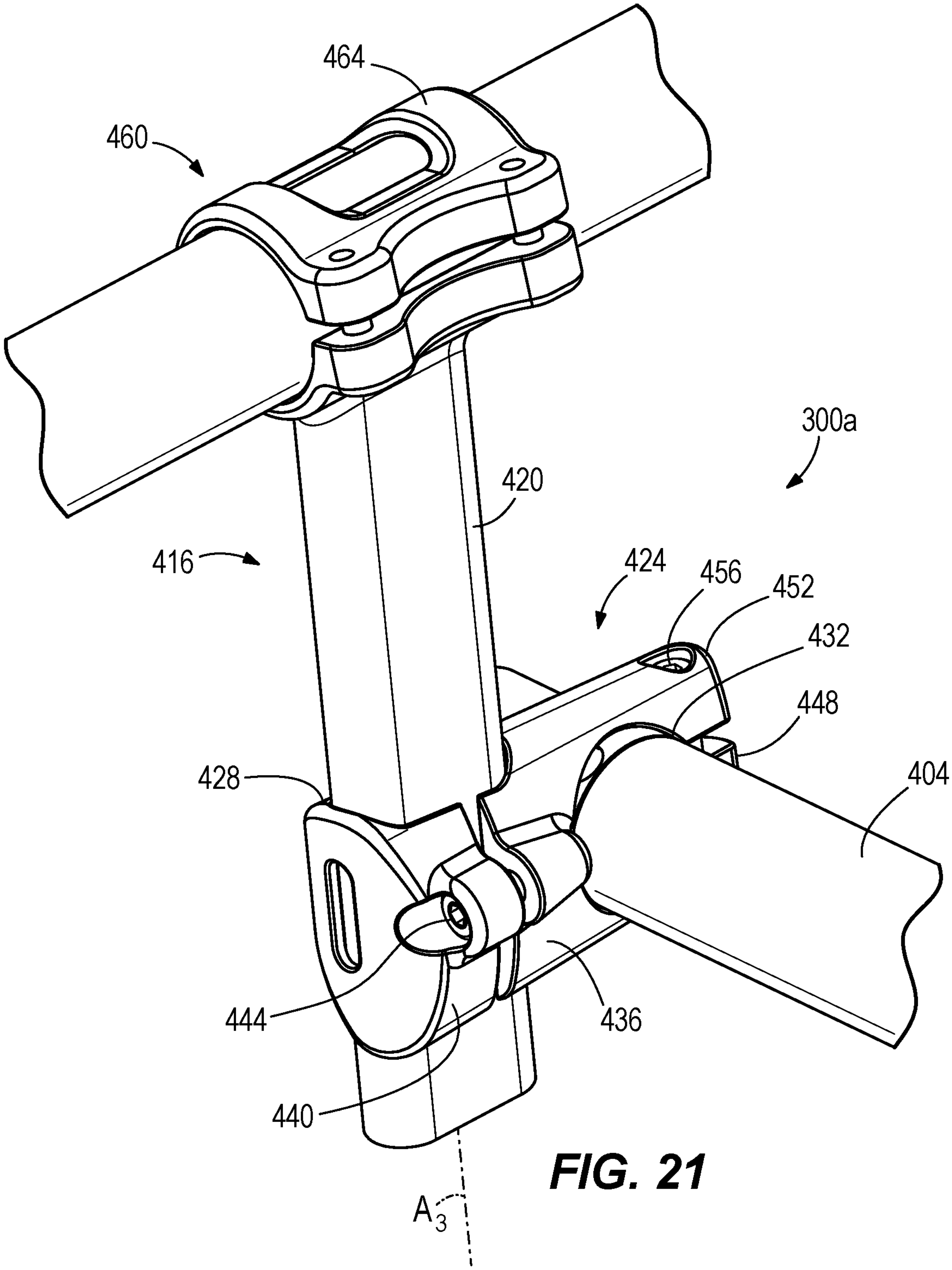
FIG. 21 is a perspective view of a portion of the axle assembly of FIG. 20, take along line 21-21 of FIG. 20.

Referring now to FIGS. 20-21, an embodiment of an axle assembly 300*a* is illustrated. The axle assembly 300*a* is selectively coupled to the frame assembly 200*a* (shown in FIG. 14). More specifically, the axle assembly 300*a* is selectively coupled to the first and second side frames 204*a*, 208*a*, and more specifically to the first and second side members 216, 216*a*. The axle assembly 300*a* provides for adjustability of a position of the wheels 104*a*, 104*b* (see FIG. 13) relative to the wheelchair 100*a*, and specifically relative to the side members 216, 216*a*, by facilitating adjustability in at least two directions.

With specific reference to FIG. 20, the axle assembly 300*a* includes a camber tube 304. The camber tube 404 is configured to engage with the rear wheels 104*a, b* (shown in FIG. 13) of the wheelchair 100*a*. More specifically, a first end 408 of the camber tube 404 includes a first channel 412 that is configured to receive a fastener (not shown) associated with the rear wheel 104*a*. The fastener couples the rear wheel 104*a* to the camber tube 404, while allowing the rear wheel 104*a* to rotate relative to the camber tube 404. A second end 408*a* of the camber tube 404, opposite the first end 408, includes a second channel 412*a* that is configured to receive a fastener (not shown) associated with the rear wheel 104*b*. The fastener couples the rear wheel 104*b* to the camber tube 404, while allowing the rear wheel 104*b* to rotate relative to the camber tube 404. The camber tube 404 generally is cylindrical in shape.

A pair of strut assemblies 416, 416*a* mount the camber tube 404 to the first and second side frames 204*a*, 208*a*. The strut assemblies 416, 416*a* are generally perpendicular to each respective side frame 204*a*, 208*a*, radially extending from the associated side frame 204*a*, 208*a*. In addition, the strut assemblies 416, 416*a* are generally perpendicular to the camber tube 404 (or a major axis of the camber tube 404 that defines an axis of rotation for the rear wheels 104*a*, 104*b* shown in FIG. 13).

A first strut assembly 416 includes a first strut tube 420. A first camber tube bracket assembly 424 selectively mounts the camber tube 404 to the first strut tube 420. With reference to FIG. 21, the first camber tube bracket assembly 424 defines a first aperture 428 and a second aperture 432. The first aperture 428 is configured to slidably receive the first strut tube 420. The second aperture 432 is configured to slidably receive the camber tube 404. More specifically, the first aperture 428 is defined by a first bracket portion 436 and a second bracket portion 440, the first and second bracket portions 436, 440 being defined by the bracket assembly 424. The first and second bracket portions 436, 440 are configured to cooperate to engage with an outer circumference of the first strut tube 420. More specifically, first and second bracket portions 436, 440 are configured to circumferentially surround the first strut tube 420 and apply a compressive force (or clamping force) to fasten the first camber tube bracket assembly 424 to the first strut tube 420. A fastener 444 (e.g., a bolt, a screw, etc.) is configured to selectively couple the first and second bracket portions 436, 440 together, and into engagement with the first strut tube 420. As the fastener 444 is tightened, the first and second bracket portions 436, 440 are drawn together to apply a compressive force (or clamping force) onto the first strut tube 420 to facilitate to selective engagement to the first strut tube 420.

The second aperture 432 is defined by a third bracket portion 448 and a fourth bracket portion 452. The third and fourth bracket portions 448, 452 are defined by the bracket assembly 424. The third and fourth bracket portions 448, 452 are configured to cooperate to engage with an outer circumference of the camber tube 404. More specifically, third and fourth bracket portions 448, 452 are configured to circumferentially surround the camber tube 404 and apply a compressive force (or clamping force) to fasten the first camber tube bracket assembly 424 to the camber tube 404. A fastener 456 (e.g., a bolt, a screw, etc.) is configured to selectively couple the third and fourth bracket portions 448, 452 together, and into engagement with the camber tube 404. As the fastener 456 is tightened, the third and fourth bracket portions 448, 452 are drawn together to apply a compressive force (or clamping force) first strut assembly 416 onto the camber tube 404 to facilitate to selective engagement to the camber tube 404. In the illustrated embodiment, the first aperture 428 is oriented perpendicular (or orthogonal) to the second aperture 432. In other examples of embodiments, the first aperture 428 can be oriented obliquely to the second aperture 432.

The first strut assembly 416 also includes a side member attachment assembly 460. The side member attachment assembly 460 defines a clamp member 464. Stated another way, the clamp member 464 is coupled to the strut tube 420. The clamp member 464 includes a pair of clamp arms that are configured to engage (or circumferentially surround) a portion of the side frame 204*a*. Once engaged, the clamp arms are fastened together by at least one fastener (e.g., a bolt, a screw, etc.) (not shown). In response to engagement with the fastener, such as tightening of the fastener, the clamp arms are drawn towards each other, applying a clamping force (or compressive force) onto the side frame 204*a* to facilitate coupling of the first strut assembly 416 to the side frame 204*a*.

The second strut assembly 416*a* is identical to the first strut assembly 416 and includes the same components. To efficiently facilitate disclosure, some of the components of the second strut assembly 416*a* are illustrated with the same identification numbers along with an "a." For example, the second strut assembly 416*a* includes a second strut tube 420*a*. However, the view provided in the figures do not provide an illustration of all the common components. To avoid repetition of the common components in association with the second strut assembly 416*a*, the disclosure will not be repeated, except that the first and second strut assemblies 416, 416*a* are the same and simply positioned on the respective side frame 204*a*, 208*a*.

To facilitate adjustment (or repositioning) of the wheels 104*a*, 104*b* (shown in FIG. 13 relative to the wheelchair 100*a*, and specifically relative to the side members 216, 216*a* (or side frames 204*a*, 208*a*), the axle assembly 300*a* can be adjusted in at least two directions. In a first direction (or an X-direction), the axle assembly 300*a* can be moved along a length of the side members 216, 216*a* (or a length of the side frames 204*a*, 208*a*). With reference to FIGS. 18 and 20, a first axis $A_1$ extends along a length of the first side member 216. A second axis $A_2$ extends along a length of the second side member 216*a*. Stated another way, the first side member 216 defines the first axis $A_1$, and the second side member 216*a* defines the second axis $A_2$. The first axis $A_1$ and the second axis $A_2$ are parallel to each other. The axle assembly 300*a* can be repositioned on the side members 216, 216*a* along the first and second axes $A_1$, $A_2$. More specifically, and with specific reference to FIG. 20, the first and second side member attachment assemblies 460, 460*a* can be respectively disengaged from the associated side member 216, 216*a* (e.g., by disengaging the fasteners, etc.). The axle assembly 300*a* can then be repositioned relative to the side members 216, 216*a* along the first and second axes $A_1$, $A_2$ to a desired location (or a desired position). More specifically, the first and second side member attachment assemblies 460, 460*a* can slide relative to the respective the side members 216, 216*a* (or side frames 204*a*, 208*a*) to a desired position. Once repositioned, the first and second side member attachment assemblies 460, 460*a* can be respectively reengaged (or engaged) with the respective side member 216, 216*a* (e.g., by engaging/reengaging the fasteners, etc.).

In a second direction (or a Y-direction), the axle assembly 300*a* can be moved along an axis defined by the strut assemblies 416, 416*a*, and more specifically along the axis define by the strut tubes 420, 420*a*. Stated another way, the camber tube 404 can be moved closer to or further away from the side members 216, 216*a*. With reference to FIG. 20, a third axis $A_3$ extends along a length of the first strut assembly 416. A fourth axis $A_4$ extends along a length of the second strut assembly 416*a*. Stated another way, the first strut assembly 416, and specifically the first strut tube 420, defines the third axis $A_3$. The second strut assembly 416*a*, and specifically the second strut tube 420*a*, defines the fourth axis $A_4$. As illustrated, the third and fourth axes $A_3$, $A_4$ are parallel to each other. The camber tube 404 can be repositioned closer to (or further away from) the side members 216, 216*a* along the third and fourth axes $A_3$, $A_4$.

In operation, to adjust the axle assembly 400 in the second direction, the first and second bracket portions 436, 440, 436*a*, 440*a* can be respectively disengaged to allow the first and second camber tube bracket assemblies 424, 424*a* to slide relative to the respective camber tube 420, 420*a*. In the embodiment of the axle assembly 300*a* shown in FIGS. 20-21, disengagement (or loosening) of the fastener 444, 444*a* disengages (or releases) the compressive force (or clamping force) the first and second bracket portions 436, 440, 436*a*, 440*a* apply to the respective strut tube 420, 420*a*. The respective bracket assemblies 424, 424*a* are free to slide relative to the strut tubes 420, 420*a* along the respective third or fourth axes $A_3$, $A_4$.

Repositioning of the bracket assemblies 424, 424*a* relative to the respective strut tubes 420, 420*a* along the respective third or fourth axes $A_3$, $A_4$ facilitates movement of the camber tube 404 closer to (or further away from) the side members 216, 216*a* (or the side frames 204*a*, 208*a*). Once the camber tube 404 is moved to a desired position, the bracket assemblies 424, 424*a* can be respectively reengaged (or engaged) with the associated strut tube 420, 420*a*. More specifically, tightening of the associated fastener 444, 444*a* reengages (or engages) the compressive force (or clamping force) the first and second bracket portions 436, 440, 436*a*, 440*a* apply to the respective strut tube 420, 420*a*. This selectively fastens the bracket assemblies 424, 424*a* to the strut tubes 420, 420*a*, maintaining the selected or desired position of the camber tube 404. It should also be appreciated that the second direction (or Y-direction) of adjustment is perpendicular to the first direction (or X-direction) of adjustment, as the second direction is the distance towards (or away) from the side members 216, 216*a* of the first and second side frames 204*a*, 208*a*. Thus, the second direction (or Y-direction) is also perpendicular to the side members 216, 216*a* (and the first and second side frames 204*a*, 208*a*).

The wheelchair 100, 100*a* incorporating the frame assembly 200, 200*a* includes certain advantages. For example, the frame assembly 200, 200*a* includes an improved leg support member 220, 220*a* geometry that positions each caster wheel 108*a*, 108*b* in vertical alignment with the associated first curved portion 228, 228*a*. The vertical alignment of the caster wheel 108*a* and the first curved portion 228, along with the serpentine geometry of the leg support member 220 and the rearward swept caster wheel 108*a* (by the mounting arm 226) advantageously provides improved maneuverability of the wheelchair 100, 100*a*. This allows a user to move the wheelchair 100, 100*a* into tight spaces and improve turning radius, as the geometry moves the leg support member 220 out of potential contact (or potential impact) of objects in the environment. In addition, the geometry allows a user to move the wheelchair closer to an object. This provides for easier and safer transfers into and out of the wheelchair 100, 100*a* (e.g., transfer between the wheelchair 100, 100*a* and another location, such as a toilet, car, bed, etc.). The frame assembly 200 is also adjustable in at least five aspects: a backrest height, a seat depth, a height (or length) of each leg support 220, 220*a*, a first angle $\theta_1$ of each leg support 220, 220*a*, and a third angle $\theta_3$ between the cane 212, 212*a* and the attached side member 216, 216*a*. This adjustability allows for improved customized fitting of the wheelchair 100, 100*a* and the associated frame assembly 200, 200*a* to the specific requirements of the user. The frame assembly 200, 200*a* also includes an axle assembly 300, 300*a* that provides two different directions of adjustability to facilitate improved adjustment of a center of gravity of the wheelchair 100, 100*a*. These and other advantages are realized by the disclosure provided herein.

What is claimed is:

1. A frame assembly for a wheelchair comprising:
a first side member;
a first leg support member coupled to the first side member; and
a foot support coupled to the first leg support member,
the first leg support member includes:
a first curved portion and a second curved portion, the first curved portion oriented to curve in a first direction, the second curved portion oriented to curve in a second direction, opposite the first direction;

a first elongated portion extending between the first curved portion and the second curved portion; and a second elongated portion extending between the second curved portion and the foot support, wherein the first elongated portion extends from the first curved portion towards a rear of the wheelchair and the second elongated portion extends from the second curved portion towards a front of the wheelchair.

2. The frame assembly of claim 1, wherein the first leg support member includes a first end opposite a second end, the first and second curved portions positioned between the first and second ends.

3. The frame assembly of claim 2, wherein the first leg support member is coupled to the first side member at the first end.

4. The frame assembly of claim 3, wherein the foot support is coupled to the first leg support member at the second end.

5. The frame assembly of claim 1, wherein the first curved portion defines a first angle, and the second curved portion defines a second angle, the first and second angles being different.

6. The frame assembly of claim 5, wherein the first angle is less than 90 degrees, and the second angle is greater than 90 degrees.

7. The frame assembly of claim 1, wherein the first curved portion includes a first end opposite a second end, the first curved portion is coupled to the first side member at the first end and the first elongated portion at the second end.

8. The frame assembly of claim 7, wherein the second curved portion includes a first end opposite a second end, the second curved portion is coupled to the first elongated portion at the first end and the second elongated portion at the second end.

9. The frame assembly of claim 1, wherein the first curved portion defines a first angle between the first side member and the first elongated portion, and the second curved portion defines a second angle between the first elongated portion and the second elongated portion, the first angle is less than the second angle.

10. The frame assembly of claim 9, wherein the first curved portion is connected to the first side member and the first elongated portion, and the second curved portion is connected to the first elongated portion and the second elongated portion.

11. The frame assembly of claim 9, wherein the first angle is 45 degrees to 70 degrees, and the second angle is greater than 90 degrees.

12. The frame assembly of claim 11, wherein the second angle is 115 degrees to 155 degrees.

13. The frame assembly of claim 1, further comprising a caster wheel coupled to the second elongated portion.

14. The frame assembly of claim 1, further comprising a mounting arm coupled to the second elongated portion, a caster wheel rotatably coupled to the mounting arm.

15. The frame assembly of claim 14, wherein the mounting arm extends away from the second elongated portion, towards a back of the wheelchair.

16. A frame assembly for a wheelchair comprising:

a first side member;

a second side member spaced from the first side member;

a first leg support coupled to the first side member;

a second leg support coupled to the second side member; and a foot support connected to first and second leg supports;

each of the first leg support and the second leg support including:

a first curved portion, a second curved portion, a first elongated member connecting the first and second curved portions; and a second elongated member connecting the second curved portion and the foot support, the first curved portion oriented to curve in a first direction, the second curved portion oriented to curve in a second direction, opposite the first direction, wherein a first angle is defined by the first curved portion and extends between each side member and the first elongated member, the first angle is less than 90 degrees.

17. The frame assembly of claim 16, wherein the first elongated member extends from the first curved portion away from a front of the wheelchair, and the second elongated member extends from the second curved portion towards the front of the wheelchair.

18. The frame assembly of claim 16, wherein a second angle is defined by the second curved portion and extends between the first elongated member and the second elongated member, the second angle is greater than 90 degrees.

19. The frame assembly of claim 16, wherein the second curved portion defines a second angle, the first angle is 45 degrees to 70 degrees and the second angle is 115 degrees to 155 degrees.

20. A frame assembly for a wheelchair comprising:

a first side member;

a second side member spaced from the first side member;

a first leg support coupled to the first side member;

a second leg support coupled to the second side member; and a foot support connected to first and second leg supports;

each of the first leg support and the second leg support including:

a first curved portion, a second curved portion, a first elongated member connecting the first and second curved portions; and a second elongated member connecting the second curved portion and the foot support, the first curved portion oriented to curve in a first direction, the second curved portion oriented to curve in a second direction, opposite the first direction, wherein the first curved portion defines a first angle, and the second curved portion defines a second angle, the first angle is 45 degrees to 70 degrees and the second angle is 115 degrees to 155 degrees.

21. The frame assembly of claim 20, wherein the first elongated member extends from the first curved portion away from a front of the wheelchair, and the second elongated member extends from the second curved portion towards the front of the wheelchair.

* * * * *